(12) United States Patent
Kawata et al.

(10) Patent No.: US 9,896,751 B2
(45) Date of Patent: Feb. 20, 2018

(54) HIGH STRENGTH STEEL SHEET AND HIGH STRENGTH GALVANIZED STEEL SHEET EXCELLENT IN SHAPEABILITY AND METHODS OF PRODUCTION OF SAME

(75) Inventors: Hiroyuki Kawata, Tokyo (JP); Naoki Maruyama, Tokyo (JP); Akinobu Murasato, Tokyo (JP); Akinobu Minami, Tokyo (JP); Takeshi Yasui, Tokyo (JP); Yuji Yamaguchi, Tokyo (JP); Natsuko Sugiura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 241 days.

(21) Appl. No.: 14/235,550

(22) PCT Filed: Jul. 27, 2012

(86) PCT No.: PCT/JP2012/069223
§ 371 (c)(1),
(2), (4) Date: Jan. 28, 2014

(87) PCT Pub. No.: WO2013/018722
PCT Pub. Date: Feb. 7, 2013

(65) Prior Publication Data
US 2014/0162088 A1   Jun. 12, 2014

(30) Foreign Application Priority Data

Jul. 29, 2011 (JP) ................. 2011-167722

(51) Int. Cl.
| | | |
|---|---|---|
| *C22C 38/38* | (2006.01) | |
| *C23C 2/06* | (2006.01) | |
| *C23C 2/28* | (2006.01) | |
| *B32B 15/01* | (2006.01) | |
| *C21D 8/02* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/22* | (2006.01) | |
| *C22C 38/26* | (2006.01) | |
| *C22C 38/28* | (2006.01) | |
| *C22C 38/32* | (2006.01) | |
| *C22C 38/34* | (2006.01) | |
| *C23C 2/02* | (2006.01) | |

(52) U.S. Cl.
CPC ............ *C22C 38/38* (2013.01); *B32B 15/013* (2013.01); *C21D 8/0205* (2013.01); *C21D 8/0236* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/26* (2013.01); *C22C 38/28* (2013.01); *C22C 38/32* (2013.01); *C22C 38/34* (2013.01); *C23C 2/02* (2013.01); *C23C 2/06* (2013.01); *C23C 2/28* (2013.01); *C21D 2211/001* (2013.01); *C21D 2211/002* (2013.01); *C21D 2211/008* (2013.01); *Y10T 428/12799* (2015.01)

(58) Field of Classification Search
CPC . C21D 2211/005; C21D 8/0205; C22C 38/02; C22C 38/06; C22C 38/38
USPC .......................................................... 148/320
See application file for complete search history.

(56) References Cited

U.S. PATENT DOCUMENTS

| | | | |
|---|---|---|---|
| 9,139,885 B2 * | 9/2015 | Kawata | ................ C21D 8/0226 |
| 2004/0238083 A1 | 12/2004 | Baek et al. | |
| 2011/0139315 A1 * | 6/2011 | Nakagaito | ................ C21D 1/25 148/533 |
| 2012/0222781 A1 | 9/2012 | Azuma et al. | |

FOREIGN PATENT DOCUMENTS

| | | | |
|---|---|---|---|
| CN | 101932744 | A | 12/2010 |
| JP | 10-280090 | A | 10/1998 |
| JP | 11-193439 | A | 7/1999 |
| JP | 2003-183775 | A | 7/2003 |
| JP | 2005-120459 | A | 5/2005 |
| JP | 2005-513271 | A | 5/2005 |
| JP | 2007-154283 | A | 6/2007 |
| JP | 2007-162078 | A | 6/2007 |
| JP | 2010-196115 | A | 9/2010 |
| JP | 2011-111671 | A | 6/2011 |
| JP | 2011-140695 | A | 7/2011 |
| WO | WO 2011/065591 | A1 | 6/2011 |

OTHER PUBLICATIONS

International Search Report for PCT/JP2012/069223 dated Oct. 23, 2012.

* cited by examiner

*Primary Examiner* — Weiping Zhu
(74) *Attorney, Agent, or Firm* — Birch, Stewart, Kolasch & Birch, LLP

(57) ABSTRACT

High strength steel sheet and high strength galvanized steel sheet which are excellent in shapeability which secure a tensile maximum strength 900 MPa or more high strength while obtaining excellent ductility and stretch flangeability, which sheets have predetermined compositions of ingredients, have steel sheet structures which contain volume fraction 1 to 20% of residual austenite phases, and which have martensite transformation points of the residual austenite phases of −60° C. or less.

12 Claims, 2 Drawing Sheets

HIGH STRENGTH STEEL SHEET AND HIGH STRENGTH GALVANIZED STEEL SHEET EXCELLENT IN SHAPEABILITY AND METHODS OF PRODUCTION OF SAME

TECHNICAL FIELD

The present invention relates to high strength steel sheet and high strength galvanized steel sheet which are excellent in shapeability and to methods of production of the same.

BACKGROUND ART

In recent years, there have been increasing demands for higher strength in the steel sheet which is used for automobiles etc. In particular, for the purpose of improving collision safety etc., high strength steel sheet with a tensile maximum stress of 900 MPa or more is also being used. Such high strength steel sheet is inexpensively formed in large volumes by press working it in the same way as soft steel sheet and is being used as structural members.

However, in recent years, along with the rapid increase in strength of high strength steel sheet, in particular in high strength steel sheet with a tensile maximum stress of 900 MPa or more, the problem has arisen of the shapeability becoming insufficient and of working accompanied with local deformation such as stretch-formability becoming difficult. For this reason, in high strength steel sheet with a high tensile maximum stress as well, realization of sufficient workability has become demanded.

PLT 1 discloses, as art for improving the bendability of high strength steel sheet, steel sheet with a tensile strength of 780 to 1470 MPa, a good shape, and excellent bendability which is obtained by taking steel sheet which has a microstructure mainly comprised of bainite or tempered martensite, making the amount of Si which is contained in the steel, by mass %, 0.6% or less, cooling down to a temperature at least 50° C. lower than a predetermined bainite transformation temperature to promote transformation from austenite to bainite or martensite and thereby rendering the volume rate of residual austenite which is contained in the structure and has a martensite transformation point of −196° C. or more 2% or less.

PLT 2 discloses, as art for improving the shapeability of high strength steel sheet, the method of improving the ductility and stretch flangeability by cooling steel sheet which has been hot rolled down to 500° C. or less, coiling it, then reheating it to 550 to 700° C., then successively performing a cold rolling process and continuous annealing process so that a second phase which contains residual austenite and further contains a low temperature transformation phase becomes fine in average particle size and so that the amount of residual austenite, amount of solid solution C in the residual austenite, and average particle size satisfy predetermined relationship formulas.

PLT 3 discloses, as art for improving the stretch flangeability of high strength steel sheet, steel sheet which is reduced in standard difference in hardness inside of the steel sheet and which is given equivalent hardness in the entire steel sheet region.

PLT 4 discloses, as art for improving the stretch flangeability of high strength steel sheet, steel sheet which is reduced in hardness of hard portions by heat treatment and which is reduced in hardness difference with the soft parts.

PLT 5 discloses, as art for improving the stretch flangeability of high strength steel sheet, rendering the hard portions the relatively soft bainite so as to reduce the difference in hardness from soft parts.

PLT 6 discloses, as art for improving the stretch flangeability of high strength steel sheet, steel sheet which has a structure comprised of, by area rate, 40 to 70% of tempered martensite and a balance of ferrite where a ratio between an upper limit value and a lower limit value of a concentration of Mn in the cross-section of the thickness direction of the steel sheet is reduced.

CITATIONS LIST

Patent Literature

PLT 1: Japanese Patent Publication No. 10-280090A
PLT 2: Japanese Patent Publication No. 2003-183775A
PLT 3: Japanese Patent Publication No. 2008-266779A
PLT 4: Japanese Patent Publication No. 2007-302918A
PLT 5: Japanese Patent Publication No. 2004-263270A
PLT 6: Japanese Patent Publication No. 2010-65307A

SUMMARY OF INVENTION

Technical Problem

In the high strength steel sheet which is described in PLT 1, there is the problem that in the steel sheet structure, there is little ferrite and residual austenite for improving the ductility and therefore sufficient ductility cannot be obtained.

The method of production of high strength steel sheet according to PLT 2 requires a large scale reheating apparatus, so there is the problem that the manufacturing cost increases.

In the arts which are described in PLTs 3 to 6 as well, the workability in high strength steel sheet with a tensile maximum strength of 900 MPa or more is insufficient.

The present invention was made in consideration of the above problems and has as its object the provision of high strength steel sheet and high strength galvanized steel sheet which are excellent in shapeability and methods of production of the same by which a tensile maximum strength 900 MPa or more high strength is secured while excellent ductility and stretch flangeability are obtained.

Solution to Problem

The inventors etc. engaged in intensive studies on the steel sheet structure and method of production for obtaining excellent ductility and stretch flangeability in high strength steel sheet. As a result, they discovered that by making the steel ingredients suitable ranges and further by establishing suitable annealing conditions after cold rolling, it is possible to make the ratio of the residual austenite phase in the steel sheet structure a predetermined range while lowering the martensite transformation start temperature of the residual austenite phase and that by producing high strength steel sheet under such conditions and controlling the ratio of the residual austenite phase in the steel sheet structure and the martensite transformation point to suitable ranges, a 900 MPa or higher tensile maximum strength is secured while the ductility and stretch flangeability (hole expandability) are improved and excellent shapeability is obtained.

The present invention was made as a result of further studies based on the above findings and has as its gist the following:

(1) High strength steel sheet which is excellent in shapeability which contains, by mass %, C: 0.075 to 0.300%, Si: 0.70 to 2.50%, Mn: 1.30 to 3.50%, P: 0.001 to 0.030%, S: 0.0001 to 0.0100%, Al: 0.005 to 1.500%, N: 0.0001 to 0.0100%, and O: 0.0001 to 0.0100%, which contains, as optional elements, one or more of Ti: 0.005 to 0.150%, Nb: 0.005 to 0.150%, B: 0.0001 to 0.0100%, Cr: 0.01 to 2.00%, Ni: 0.01 to 2.00%, Cu: 0.01 to 2.00%, Mo: 0.01 to 1.00%, V: 0.005 to 0.150%, and one or more of Ca, Ce, Mg, Zr, Hf, and REM: total 0.0001 to 0.5000%, and has a balance of iron and unavoidable impurities, wherein the structure of the steel sheet contains, by volume fraction, 2 to 20% of residual austenite phase, and the residual austenite phase has a martensite transformation point of −60° C. or less.

(2) The high strength steel sheet which is excellent in shapeability according to (1), characterized in that a ratio of the residual austenite phase which transforms to martensite at −198° C. is, by volume fraction, 2% or less of the total residual austenite phase.

(3) The high strength steel sheet which is excellent in shapeability according to (1) or (2), characterized in that the residual austenite phase has a martensite transformation point of −198° C. or less.

(4) The high strength steel sheet which is excellent in shapeability according to any one of claims 1 to 3, characterized in that the structure of the steel sheet further contains, by volume fraction, ferrite phase: 10 to 75%, bainitic ferrite phase and/or bainite phase: 10 to 50%, tempered martensite phase: 10 to 50%, and fresh martensite phase: 10% or less.

(5) High strength galvanized steel sheet which is excellent in shapeability characterized by comprising the high strength steel sheet according to any one of (1) to (4) on the surface of which a galvanized layer is formed.

(6) A method of production of high strength steel sheet which is excellent in shapeability characterized by comprising a hot rolling process of heating a slab which contains, by mass %, C: 0.075 to 0.300%, Si: 0.70 to 2.50%, Mn: 1.30 to 3.50%, P: 0.001 to 0.030%, S: 0.0001 to 0.0100%, Al: 0.005 to 1.500%, N: 0.0001 to 0.0100%, and O: 0.0001 to 0.0100%, which contains, as optional elements, one or more of Ti: 0.005 to 0.150%, Nb: 0.005 to 0.150%, B: 0.0001 to 0.0100%, Cr: 0.01 to 2.00%, Ni: 0.01 to 2.00%, Cu: 0.01 to 2.00%, Mo: 0.01 to 1.00%, V: 0.005 to 0.150%, and one or more of Ca, Ce, Mg, Zr, Hf, and REM: total 0.0001 to 0.5000%, and has a balance of iron and unavoidable impurities, directly, or after cooling once, to 1050° C. or more, finishing the rolling at the $Ar_3$ point or more to obtain a steel sheet, and coiling it at 500 to 750° C. in temperature, a cold rolling process of pickling the coiled steel sheet, then cold rolling it by a screwdown rate of a screwdown rate 35 to 75%, and an annealing process of heating the steel sheet after the cold rolling process up to a maximum heating temperature of 740 to 1000° C., then cooling by an average cooling rate from the maximum heating temperature to 700° C. of 1.0 to 10.0° C./sec and by a 700 to 500° C. average cooling rate of 5.0 to 200° C./sec, next holding at 350 to 450° C. for 30 to 1000 seconds, then cooling down to room temperature and, while cooling from the maximum heating temperature to room temperature, reheating from the Bs point or less than 500° C. to 500° C. or more at least once and reheating from the Ms point or less than 350° C. to 350° C. or more at least once.

(7) The method of production of high strength galvanized steel sheet which is excellent in shapeability characterized by producing high strength steel sheet by the method of production of high strength steel sheet according to (6), then galvanizing it.

(8) A method of production of high strength galvanized steel sheet which is excellent in shapeability characterized by producing high strength steel sheet by the method of production according to (6) during the annealing process of which, at the time of cooling from the maximum heating temperature to room temperature, dipping the steel sheet after the cold rolling process in a zinc bath so as to hot dip galvanize it.

(9) A method of production of high strength galvanized steel sheet which is excellent in shapeability characterized by producing high strength steel sheet by the method of production according to (6) after the annealing process of which performing hot dip galvanization.

(10) A method of production of high strength galvanized steel sheet which is excellent in shapeability according to (8) or (9) characterized by performing alloying treatment at 470 to 650° C. in temperature after the hot dip galvanization.

Advantageous Effects of Invention

According to the present invention, high strength steel sheet where a 900 MPa or higher tensile maximum strength is secured while excellent shapeability is obtained can be realized.

DESCRIPTION OF EMBODIMENTS

Figure 1A:
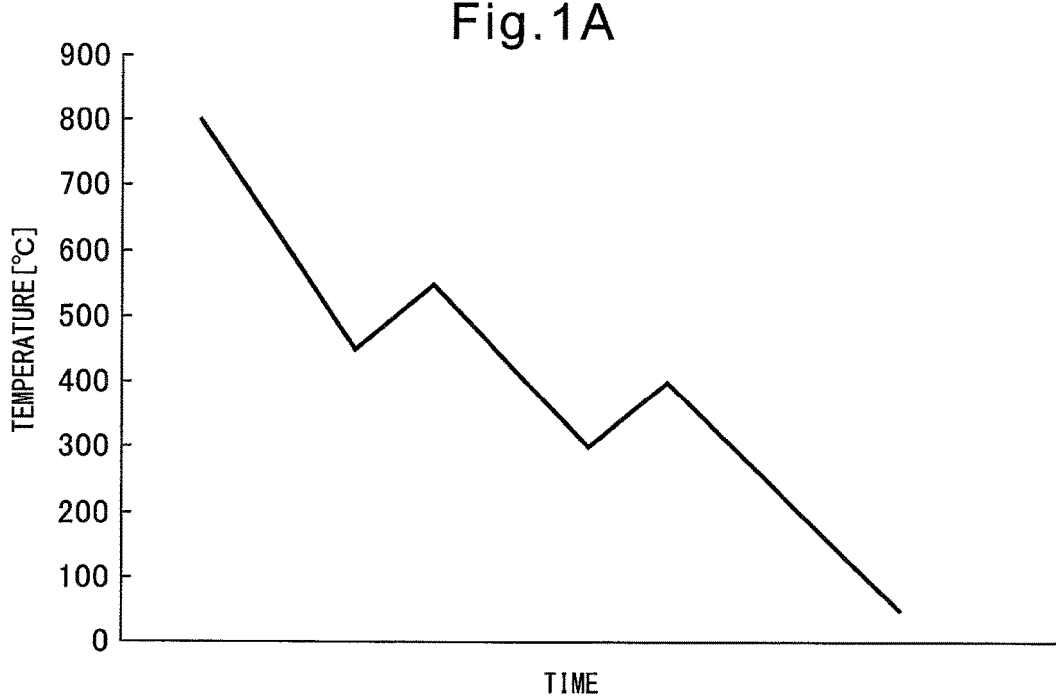
FIG. 1A is a view which shows an example of a cooling pattern in annealing treatment in the method of production of the present invention.

Below, high strength steel sheet and high strength galvanized steel sheet which are excellent in shapeability and methods of production of the same of embodiments of the present invention will be explained. Note that the following embodiments are explained in detail for enabling the gist of the present invention to be understood better, so unless otherwise indicated, do not limit the present invention.

Note that, in the following explanation, the start temperature at which austenite (γ-iron) transforms to martensite in the process of the drop in temperature in the production of steel sheet will be referred to as the "Ms point" while the start temperature at which the residual austenite in the structure of the high strength steel sheet of the present invention which is produced transforms to martensite will be referred to as the "$Ms_r$ point".

First, the structure of the high strength steel sheet of the present invention will be explained.

The steel sheet structure of the high strength steel sheet of the present invention has a 2 to 20% residual austenite phase. The residual austenite phase has an $Ms_r$ point of −60° C. or less. The residual austenite phase which is contained in such a steel sheet structure of the high strength steel sheet of the present invention is stable even with respect to a plurality of deep cooling treatments.

The structure other than the residual austenite phase is not particularly limited so long as a tensile maximum strength of 900 MPa or higher in strength can be secured, but preferably has, by volume fraction in the steel sheet structure, a ferrite phase: 10 to 75%, bainitic ferrite phase and/or bainite phase: 10 to 50%, tempered martensite phase: 10 to 50%, and fresh martensite phase: 10% or less. By having such a steel sheet structure, the result becomes high strength steel sheet which has a more excellent shapeability.

The phases which can be obtained in the structure of the steel sheet will be explained below:

Residual Austenite Phase

The residual austenite phase has the property of greatly improving the strength and ductility, but in general forming starting points of fracture and greatly degrading the stretch flangeability.

In the structure of the present steel sheet, by reheating two times as explained later, the defects which were present in the residual austenite phase and were liable to form starting sites for martensite transformation are already consumed and only the austenite phase with its high degree of cleanliness selectively remains. As a result, an extremely stable residual austenite phase is obtained. Such a residual austenite phase gradually transforms to martensite along with deformation, so has the property of not easily forming starting points of fracture and causing extremely little deterioration of the stretch flangeability.

As an indicator of the above-mentioned stability, the martensite transformation start temperature ($Ms_r$ point) of the residual austenite phase may be mentioned. Stable residual austenite in which an austenite phase with high degree of cleanliness remains does not change in amount of residual austenite even with dipping in liquid nitrogen for 1 hour, that is, applying so-called deep cooling treatment. The $Ms_r$ point is the liquid nitrogen temperature (−198° C.) or less and is extremely stable. Furthermore, in general, by repeatedly apply deep cooling treatment, the residual austenite is gradually decreased, but in the high strength steel sheet according to the present invention, the residual austenite does not decrease and is extremely stable even if treated for deep cooling five times.

The steel sheet of the present invention gives high strength steel sheet with a strength and ductility which are greatly improved and with a stretch flangeability which is extremely small in deterioration by a residual austenite phase with an $Ms_r$ point of −60° C. or less present in a volume fraction of 2% or more.

From the viewpoint of the strength and ductility, the volume fraction of the residual austenite phase in the steel sheet structure is preferably 4% or more, more preferably 6% or more. On the other hand, to make the volume fraction of the residual austenite phase in the steel sheet structure over 20%, it is necessary to add elements such as C or Mn in over the suitable quantity resulting in the weldability being impaired, so the upper limit of the residual austenite phase is made 20%.

In the present invention, the ratio of the residual austenite phase which transforms to martensite at −198° C. is preferably a volume fraction of 2% or less. Due to this, a more stable residual austenite phase is obtained, so the ductility and stretch flangeability are remarkably improved and excellent shapeability is obtained.

Further, if the $Ms_r$ point of the residual austenite in the steel sheet structure is −198° C. or less, the result becomes a more stable residual austenite phase, the ductility and stretch flangeability are further remarkably improved, and excellent shapeability is obtained, so this is preferable.

The volume fraction of the residual austenite phase is obtained by examining the steel sheet at the plane parallel to the sheet surface at ¼ thickness by X-ray analysis, calculating the area fraction, and deeming this as the volume fraction. However, the ¼ thickness plane is made the plane obtained by grinding and chemically polishing the base material again after deep cooling treatment to obtain a mirror finish.

Further, considering measurement error, the residual austenite phase is deemed to transform to martensite at the point of time when the relationship shown below is satisfied:

$$V\gamma(n)/V\gamma(0)<0.90$$

where, "n" is the number of times of deep cooling treatment, $V\gamma(n)$ is the residual austenite percent after the n-th deep drawing treatment, and $V\gamma(0)$ is the residual austenite percent in the base material.

Ferrite Phase

The ferrite phase is a structure which is effective for improving the ductility and is preferably contained in the steel sheet structure in a volume fraction of 10 to 75%. If the volume fraction of the ferrite phase in the steel sheet structure is less than 10%, sufficient ductility is liable to not be obtained. The volume fraction of the ferrite phase in the steel sheet structure, from the viewpoint of the ductility, is more preferably 15% or more, still more preferably 20% or more. The ferrite phase is a soft structure, so if the volume fraction exceeds 75%, sufficient strength will sometimes not be obtained. To sufficiently raise the tensile strength of steel sheet, the volume fraction of the ferrite phase in the steel sheet structure is more preferably made 65% or less, still more preferably made 50% or less.

Bainitic Ferrite Phase and/or Bainite Phase The bainitic ferrite phase and/or bainite phase is a structure with a good balance of strength and ductility and is preferably contained in the steel sheet structure in a volume fraction of 10 to 50%. The bainitic ferrite phase and/or bainite is a microstructure which has a strength intermediate to that of a soft ferrite phase and hard martensite phase and tempered martensite phase and residual austenite phase. From the viewpoint of the stretch flangeability, inclusion of 15% or more is more preferable and inclusion of 20% or more is further preferable. If the volume fraction of the bainitic ferrite phase and/or bainite exceeds 50%, the yield stress will excessively rise and the shape freezability will deteriorate, so this is not preferred.

Tempered Martensite Phase

The tempered martensite phase is a structure which greatly improves the tensile strength and may be included in the steel sheet structure to a volume fraction of 50% or less. From the viewpoint of the tensile strength, the volume fraction of the tempered martensite is preferably 10% or more. If the volume fraction of the tempered martensite which is contained in the steel sheet structure exceeds 50%, the yield stress will excessively rise and the shape freezability deteriorates, so this is not preferable.

Fresh Martensite Phase

The fresh martensite phase has the effect of greatly improving the tensile strength. However, it forms starting points of fracture and greatly degrades the stretch flangeability, so it preferably limited to a volume fraction of 15% in the steel sheet structure. To raise the stretch flangeability, it is more preferable to make the volume fraction of the fresh martensite phase in the steel sheet structure 10% or less, still more preferably 5% or less.

Others

The steel sheet structure of the high strength steel sheet of the present invention may further contain a pearlite phase and/or coarse cementite phase or other structure. However, if the steel sheet structure of high strength steel sheet contains a large amount of pearlite phase and/or coarse cementite phase, the problem arises of the bendability deteriorating. From this, the volume fraction of the pearlite phase and/or coarse cementite phase which is contained in the steel sheet structure is preferably a total of 10% or less, more preferably 5% or less.

The volume fractions of the different structures which are contained in the steel sheet structure of the high strength steel sheet of the present invention can, for example, be measured by the following method:

In measuring the volume fractions of the ferrite phase, bainitic ferrite phase, bainite phase, tempered martensite phase, and fresh martensite phase which are contained in the steel sheet structure of the high strength steel sheet of the present invention, first, a sample is taken using the cross-section of sheet thickness parallel to the rolling direction of the steel sheet as the examined surface. Further, the examined surface of this sample is polished and etched by Nital and the range from ⅛ to ⅜ of the sheet thickness is observed by a field emission scanning electron microscope (FE-SEM) to measure the area fraction. This was deemed as the volume fraction.

Next, the composition of ingredients of the high strength steel sheet of the present invention will be explained. Note that in the following explanation unless particularly designated otherwise, "%" indicates "mass %".

C: 0.075 to 0.300%

C is an element which is required for obtaining a residual austenite phase. It is included for achieving both an excellent shapeability and high strength. If the content of C exceeds 0.300%, the weldability becomes insufficient. From the viewpoint of the weldability, the content of C is more preferably 0.250% or less, still more preferably 0.220% or less. If the content of C is less than 0.075%, it becomes difficult to obtain a sufficient amount of residual austenite phase and the strength and shapeability fall. From the viewpoint of the strength and shapeability, the content of C is more preferably 0.090% or more, still more preferably 0.100% or more.

Si: 0.70 to 2.50%

Si is an element which enables the residual austenite phase to be easily obtained by suppressing the formation of iron-based carbides in the steel sheet and is an element which is necessary for raising the strength and shapeability. If the content of Si exceeds 2.50%, the steel sheet becomes brittle and the ductility deteriorates. From the viewpoint of the ductility, the content of Si is more preferably 2.20% or less, still more preferably 2.00% or less. If the content of Si is less than 0.70%, iron-based carbides form after annealing while cooling down to room temperature, the residual austenite phase cannot sufficiently be obtained, and the strength and shapeability deteriorate. From the viewpoint of the strength and shapeability, the lower limit value of Si is more preferably 0.90% or more, still more preferably 1.00% or more.

Mn: 1.30 to 3.50%

Mn is added for raising the strength of the steel sheet. If the content of Mn exceeds 3.50%, coarse MN concentrated parts form at the center of thickness of the steel sheet, embrittlement easily occurs, and the cracking of the cast slab or other trouble easily arises. Further, if the content of Mn exceeds 3.50%, there is the problem that the weldability also deteriorates. Therefore, the content of Mn has to be made 3.50% or less. From the viewpoint of the weldability, the content of Mn is more preferably 3.20% or less, still more preferably 3.00% or less. If the content of Mn is less than 1.30%, a large amount of soft structures are formed during the cooling after the annealing, so securing a 900 MPa or more tensile maximum strength becomes difficult. Therefore, the content of Mn has to be made 1.30% or more. Further, to raise the strength of the steel sheet, the content of Mn is more preferably 1.50% or more, still more preferably 1.70% or more.

P: 0.001 to 0.030%

P tends to segregate at the center of thickness of the steel sheet and has the probability of causing the weld zone to become brittle. If the content of P exceeds 0.030%, the weld zone becomes greatly brittle, so the content of P is limited to 0.030% or less. The lower limit of P is not particularly set so long as the effect of the present invention is exhibited, but if making the content of P less than 0.001%, the manufacturing cost greatly increases, so 0.001% is made the lower limit.

S: 0.0001 to 0.0100%

S has a detrimental effect on the weldability and the manufacturability at the time of casting and at the time of hot rolling. Therefore, the upper limit value of the content of S is made 0.0100% or less. Further, S bonds with Mn to form coarse MnS which causes the ductility and stretch flangeability to fall, so the content is more preferably made 0.0050% or less, still more preferably 0.0025% or less. The lower limit of the content of S is not particularly set so long as the effect of the present invention is exhibited, but if making the content of S less than 0.0001%, the manufacturing cost greatly increases, so 0.0001% is made the lower limit.

Al: 0.005 to 1.500%

Al is an element which suppresses the formation of iron-based carbides and enables residual austenite to be easily obtained. It raises the strength and shapeability of steel sheet. If the content of Al exceeds 1.500%, the weldability deteriorates, so the upper limit is made 1.500%. From the viewpoint of the weldability, the content of Al is more preferably 1.200% or less, still more preferably 0.900% or less. Al is an element which is effective also as a deoxidizing material, but if the content of Al is less than 0.005%, the effect as a deoxidizing material is not sufficiently obtained, so the lower limit of the content of Al is made 0.005%. To sufficiently obtain the effect of deoxidation, the amount of Al is more preferably made 0.010% or more.

N: 0.0001 to 0.0100%

N forms coarse nitrides which cause the ductility and stretch flangeability to deteriorate, so the amount of addition has to be kept down. If the content of Ni exceeds 0.0100%, this tendency becomes more marked, so the upper limit of the content of N is made 0.0100%. N becomes a cause of formation of blowholes at the time of welding, so the smaller the content, the better. The lower limit of the content of N is not particularly set so long as the effect of the present invention is exhibited, but if making the content of N less than 0.0001%, the manufacturing cost greatly increases, so 0.0001% is made the lower limit.

O: 0.0001 to 0.0100%

O forms oxides which cause the ductility and stretch flangeability to deteriorate, so the content has to be kept down. If the content of O exceeds 0.0100%, the deterioration of the stretch flangeability becomes remarkable, so the upper limit of the content of O is made 0.0100% or less. The content of O is more preferably 0.0080% or less, still more preferably 0.0060% or less. The lower limit of the content of O is not particularly set so long as the effect of the present invention is exhibited, but if making the content of O less than 0.0001%, the manufacturing cost greatly increases, so 0.0001% is made the lower limit.

The high strength steel sheet of the present invention may further contain the elements which are shown below in accordance with need:

Ti: 0.005 to 0.150%

Ti is an element which contributes to the rise in strength of the steel sheet through precipitation strengthening, fine grain strengthening by suppression of growth of ferrite crystal grains, and dislocation strengthening through suppression of recrystallization. If the content of Ti exceeds 0.150%, precipitation of carbonitrides increases and the shapeability deteriorates, so the content of Ti is made 0.150% or less. From the viewpoint of the shapeability, the content of Ti is more preferably 0.100% or less, still more preferably 0.070% or less. To sufficiently obtain the effect of the rise in strength by Ti, the content of Ti has to be made 0.005% or more. To raise the strength of the steel sheet, the content of Ti is preferably 0.010% or more, more preferably 0.015% or more.

Nb: 0.005 to 0.150%

Nb is an element which contributes to the rise in strength of the steel sheet through precipitation strengthening, fine grain strengthening by suppression of growth of ferrite crystal grains, and dislocation strengthening through suppression of recrystallization. If the content of Nb exceeds 0.150%, precipitation of carbonitrides increases and the shapeability deteriorates, so the content of Nb is made 0.150% or less. From the viewpoint of the shapeability, the content of Nb is more preferably 0.100% or less, still more preferably 0.060% or less. To sufficiently obtain the effect of the rise in strength by Nb, the content of Nb has to be made 0.005% or more. To raise the strength of the steel sheet, the content of Nb is preferably 0.010% or more, more preferably 0.015% or more.

V: 0.005 to 0.150%

V is an element which contributes to the rise in strength of the steel sheet by precipitation strengthening, fine grain strengthening by suppression of growth of ferrite crystal grains, and dislocation strengthening through suppression of recrystallization. If the content of V exceeds 0.150%, precipitation of carbonitrides increases and the shapeability deteriorates, so the content is made 0.150% or less. To sufficiently obtain the effect of raising the strength by V, the content has to be 0.005% or more.

B: 0.0001 to 0.0100%

B is an element which suppresses phase transformation at a high temperature and is effective for increasing the strength and can be added in place of part of the C and/or Mn. If the content of B exceeds 0.0100%, the workability while hot is impaired and the productivity falls, so the content of B is made 0.0100% or less. From the viewpoint of the productivity, the content of B is preferably 0.0050% or less, more preferably 0.0030% or less. To sufficiently obtain higher strength by B, the content of B has to be made 0.0001% or more. To effectively increase the strength of the steel sheet, the content of B is preferably 0.0003% or more, more preferably 0.0005% or more.

Mo: 0.01 to 1.00%

Mo is an element which suppresses phase transformation at a high temperature and is effective for increasing the strength and can be added in place of part of the C and/or Mn. If the content of Mo exceeds 1.00%, the workability when hot is impaired and the productivity falls, so the content of Mo is made 1.00% or less. To sufficiently obtain higher strength by Mo, the content has to be 0.01% or more.

W: 0.01 to 1.00%

W is an element which suppresses phase transformation at a high temperature and is effective for increasing the strength and can be added in place of part of the C and/or Mn. If the content of W exceeds 1.00%, the workability when hot is impaired and the productivity falls, so the content of W is made 1.00% or less. To sufficiently obtain higher strength by W, the content has to be 0.01% or more.

Cr: 0.01 to 2.00%

Cr is an element which suppresses phase transformation at a high temperature and is effective for increasing the strength and can be added in place of part of the C and/or Mn. If the content of Cr exceeds 2.00%, the workability when hot is impaired and the productivity falls, so the content of Cr is made 2.00% or less. To sufficiently obtain higher strength by Cr, the content has to be 0.01% or more.

Ni: 0.01 to 2.00%

Ni is an element which suppresses phase transformation at a high temperature and is effective for increasing the strength and can be added in place of part of the C and/or Mn. If the content of Ni exceeds 2.00%, the weldability is impaired, so the content of Ni is made 2.00% or less. To sufficiently obtain higher strength by Ni, the content has to be 0.01% or more.

Cu: 0.01 to 2.00%

Cu is an element which raises the strength by presence as fine particles in the steel and can be added in place of part of the C and/or Mn. If the content of Cu exceeds 2.00%, the weldability is impaired, so the content is made 2.00% or less. To sufficiently obtain higher strength by Cu, the content has to be 0.01% or more.

One or More of Ca, Ce, Mg, Zr, Hf, and REM: Total 0.0001 to 0.5000%

Ca, Ce, Mg, Zr, Hf, and REM are elements which are effective for improving the shapeability. One or more can be added. If the content of the one or more of Ca, Ce, Mg, Zr, Hf, and REM exceeds a total of 0.5000%, conversely the ductility is liable to be impaired, so the total of the contents of the elements is made 0.5000% or less. To sufficiently obtain the effect of improvement of the shapeability of the steel sheet, the total of the contents of the elements has to be 0.0001% or more. From the viewpoint of the shapeability, the total of the contents of the elements is preferably 0.0005% or more, more preferably 0.0010% or more. Here, "REM" is an abbreviation for "rare earth metal" and indicates the elements which belong to the lanthanoid series. In the present invention, the REM or Ce is often added as a Misch metal. Sometimes, elements of the lanthanoid series in addition to La or Ce are contained compositely. Further, even when elements of the lanthanoid series other than La and Ce are included, the effects of the present invention are exhibited. Further, even if adding metal La or Ce, the effects of the present invention are exhibited.

Above, the composition of ingredients of the present invention was explained, but so long as in a range not impairing the properties of the steel sheet of the present invention, for example, elements other than the essential added elements may also be included as impurities which are derived from the starting materials.

The high strength steel sheet of the present invention can also be made high strength galvanized steel sheet on the surface of which a galvanized layer or galvannealed layer is formed. By forming a galvanized layer on the surface of the high strength steel sheet, steel sheet which has excellent corrosion resistance results. Further, by forming a galvannealed layer on the surface of the high strength steel sheet, steel sheet which has excellent corrosion resistance and which has excellent coating adhesion results.

Next, the method of production of the high strength steel sheet of the present invention will be explained.

To produce the high strength steel sheet of the present invention, first, a slab which has the above-mentioned composition of ingredients is cast. As the slab which is used for hot rolling, for example, it is possible to use a continuously cast slab or a slab which is produced by a thin slab caster etc. For the method of production of the high strength steel sheet of the present invention, it is preferable to use a process such as continuous casting-direct rolling (CC-DR) where the steel is cast, then immediately hot rolled.

The slab heating temperature in the hot rolling process has to be 1050° C. or more. If the slab heating temperature is low, the finish rolling temperature falls below the $Ar_3$ point. As a result, two-phase rolling of the ferrite phase and austenite phase results, so the hot rolled sheet structure becomes an uneven mixed grain structure. The uneven structure is not eliminated even after the cold rolling and annealing process and therefore the ductility and bendability deteriorate. Further, if the finish rolling temperature falls, the rolling load increases and the rolling becomes difficult or shape defects are liable to be invited in the steel sheet after rolling. The upper limit of the slab heating temperature is not particularly set so long as the effect of the present invention is exhibited, but it is not preferable economically to set the heating temperature to an excessively high temperature, so the upper limit of the slab heading temperature is preferably made 1350° C. or less.

The $Ar_3$ point can be calculated by the following formula:

$$Ar_3(° C.)=901-325 \times C+33 \times Si-92 \times (Mn+Ni/2+Cr/2+Cu/2+Mo/2)+52 \times Al$$

In the above formula, C, Si, Mn, Ni, Cr, Cu, Mo, and Al are the contents of the different elements (mass %).

The finish rolling temperature of the hot rolling is made the higher of 800° C. or the $Ar_3$ point as the lower limit and 1000° C. as the upper limit. If the finish rolling temperature is less than 800° C., the rolling load at the time of finish rolling becomes high, the rolling becomes difficult, and shape defects are liable to be invited in the hot rolled steel sheet which is obtained after rolling. If the finish rolling temperature is less than the $Ar_3$ point, the hot rolling becomes two-phase region rolling of the ferrite phase and austenite phase and the hot rolled steel sheet structure will sometimes become an uneven mixed grain structure.

The upper limit of the finish rolling temperature is not particularly set so long as the effect of the present invention is exhibited, but if the finish rolling temperature is made excessively high, to secure that temperature, the slab heating temperature has to be made excessively high. Therefore, the upper limit temperature of the finish rolling temperature is preferably made 1000° C. or less.

The steel sheet after rolling is coiled at 500 to 750° C. If coiling the steel sheet at a temperature exceeding 750° C., the oxides which are formed on the steel sheet surface excessively increase in thickness and the pickling ability deteriorates. To raise the pickling ability, the coiling temperature is preferably 720° C. or less, more preferably 700° C. or less. If the coiling temperature becomes less than 500° C., the hot rolled steel sheet becomes excessively high in strength and cold rolling becomes difficult. From the viewpoint of lightening the load in cold rolling, the coiling temperature is preferably made 550° C. or more. 600° C. or more is more preferable.

The thus produced hot rolled steel sheet is pickled. Due to the pickling, the oxides on the steel sheet surface can be removed. This is important from the point of improving the chemical convertability of the cold rolled high strength steel sheet of the final product or the hot dip coatability of cold rolled steel sheet for hot dip galvanized or galvannealed steel sheet use. The pickling may be just a single treatment or may be divided into a plurality of treatments.

The pickled steel sheet may be supplied as is to the annealing process, but by cold rolling it by a screwdown rate of 35 to 75%, steel sheet with a high thickness precision and excellent shape is obtained. If the screwdown rate is less than 35%, it is difficult to hold the shape flat and the final product becomes poor in ductility, so the screwdown rate is made 35% or more. If the screwdown rate exceeds 75%, the cold rolling load becomes too great and cold rolling becomes difficult. From this, the upper limit of the screwdown rate is made 75%. The number of rolling passes and the screwdown rate for each pass are not particularly prescribed so long as the effect of the present invention is exhibited.

Next, the obtained hot rolled steel sheet or cold rolled steel sheet is subjected to the following annealing treatment.

First, the rolled steel sheet is heated to a maximum heating temperature of 740 to 1000° C. in range. If the maximum heating temperature is less than 740° C., the amount of the austenite phase becomes insufficient and it becomes difficult to secure a sufficient amount of hard structures in the phase transformation during subsequent cooling. If the maximum heating temperature exceeds 1000° C., the austenite phase becomes coarse in particle size, transformation does not easily proceed during cooling, and, in particular, a soft ferrite structure becomes hard to be sufficiently obtained.

The heating up to the maximum heating temperature is preferably performed with a heating rate from the (maximum heating temperature −20)° C. to maximum heating temperature, that is, in the last 20° C. at the time of heating, of 0.1 to 0.8° C./sec. By making the heating rate in the 20° C. up to the maximum heating temperature gradual heating in the above range, the effects are obtained that the rate of advance of reverse transformation to the austenite phase becomes slower and the defects in the initial austenite phase become smaller.

The holding time at the time of heating to the maximum heating temperature may be suitably determined in accordance with the maximum heating temperature etc. and is not particularly limited, but 10 seconds or more is preferable, while 40 to 540 seconds is more preferable.

Next, primary cooling is performed by an average cooling rate from the maximum heating temperature to 700° C. of 1.0 to 10.0° C./sec. By this primary cooling, it is possible to make the ferrite transformation and transformation to bainitic ferrite and/or bainite suitably proceed while leaving a non-transformed austenite phase until the Ms point and transforming all or part to martensite.

If the average cooling rate in the above cooling temperature range is less than 1.0° C./sec, pearlite transformation proceeds during the cooling whereby the nontransformed austenite phase is reduced and a sufficient hard structure cannot be obtained. As a result, sometimes it is not possible to secure a tensile maximum strength 900 MPa or more strength. If the average cooling rate exceeds 10.0° C./sec, sometimes a soft ferrite structure cannot be sufficiently formed.

The holding time in the ferrite transformation temperature region from right after heating to when the steel sheet temperature reaches 700° C. is not particularly limited, but is preferably 20 to 1000 seconds. To make the soft ferrite phase sufficiently form, it is necessary to hold the steel for 20 seconds or more in the ferrite transformation temperature region from right after annealing to when the steel sheet temperature reaches 700° C., preferably hold it there for 30 seconds or more, more preferably hold it there for 50 seconds or more. If the time during which the steel is made to held at the ferrite transformation temperature region exceeds 1000 seconds, the ferrite transformation excessively proceeds, the nontransformed austenite is reduced, and a sufficient hard structure cannot be obtained.

Furthermore, after the above primary cooling, secondary cooling is performed by an average cooling rate from 700 to 500° C. of 5.0 to 200° C./sec. Due to this secondary cooling, the transformation from austenite to ferrite after annealing reliably proceeds. If cooling by a 1° C./sec to 10.0° C./sec average cooling rate similar to the primary cooling from a temperature region exceeding 700° C., the ferrite phase is insufficiently formed and the ductility of the high strength steel sheet cannot be secured.

In the method of production of the present invention, the steel sheet which has been treated to cool in the above two stages is held at 350 to 450° C. in temperature for 30 to 1000 seconds of time. If the holding temperature at this time is less than 350° C., fine iron-based carbides form and concentration of C at the austenite phase does not proceed resulting in an unstable austenite phase. If the holding time exceeds 450° C., the solid solution limit of C in the austenite phase becomes lower and C becomes saturated even at a small amount, so concentration of C does not proceed resulting in an unstable austenite phase.

If the holding time is less than 30 second, the bainite transformation does not sufficiently proceed, the amount of C (carbon) which is discharged from the bainite phase to the austenite phase is small, the concentration of C at the austenite phase becomes insufficient, and an unstable austenite phase results. If the holding time exceeds 1000 seconds, coarse iron-based carbides start to form and the concentration of C in the austenite conversely falls, so an unstable austenite phase results.

Furthermore, in the annealing process of the present invention, as shown in FIG. 1A, when cooling from the maximum heating temperature to room temperature, the steel is reheated from the Bs point (bainite transformation start temperature) or less than 500° C. to 500° C. or more at least once and is reheated from the Ms point or less than 350° C. to 350° C. or more at least once. By performing reheating treatment by such two types of conditions, it is possible to make the austenite phase which has internal defects and easily transforms to other structures in the nontransformed residual austenite phase, that is, the unstable austenite phase, preferentially transform and obtain a bainite phase, bainitic ferrite phase, or tempered martensite phase.

Figure 1B:
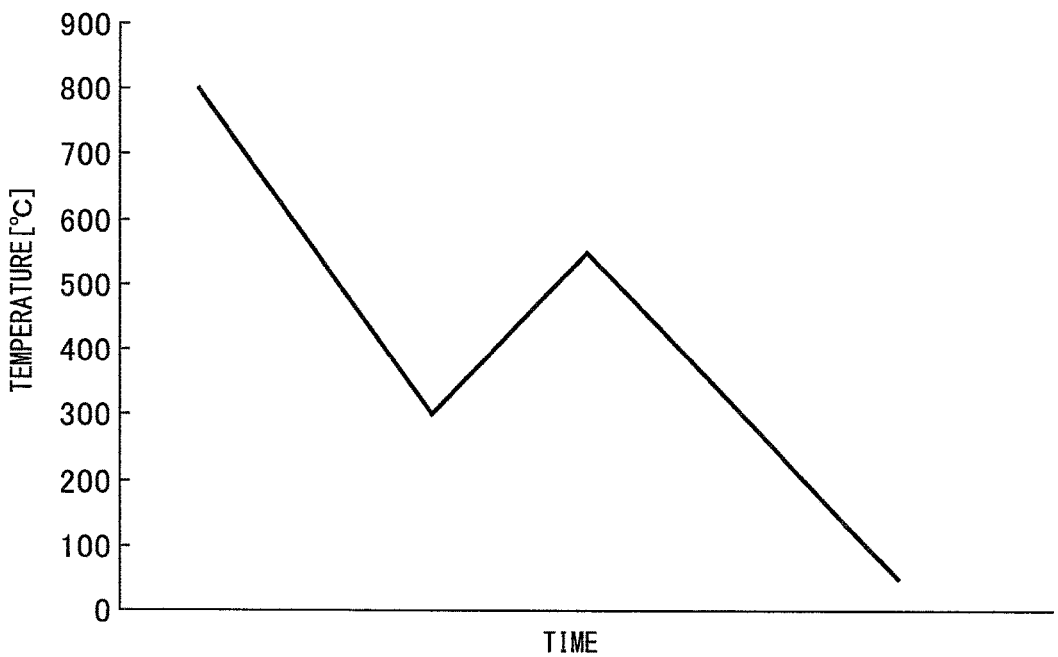
FIG. 1B is a view which shows another example of a cooling pattern in annealing treatment in the method of production of the present invention

Note that, for example, as shown in FIG. 1B, even if cooling down to the Ms point or less than 350° C., then reheating to 500° C. or more, it is deemed that the reheating from the Ms point or less than 350° C. to 350° C. or more and the reheating from the Bs point or less than 500° C. to 500° C. or more have respectively been performed. Such a pattern of reheating treatment may also be performed.

Further, it is possible to hold the steel at the above-mentioned 350 to 450° C. temperature range between the reheating from the Ms point or less than 350° C. to 350° C. or more and the reheating from the Bs point or less than 500° C. to 500° C. or more.

The Bs point (bainite transformation start temperature) can be calculated by the following formula:

$$Bs(° C.)=820-290C/(1-VF)-37Si-90Mn-65Cr-50Ni+70Al$$

In the above formula, VF is the volume fraction of ferrite, while C, Mn, Cr, Ni, Al, and Si are the amounts of addition of these elements (mass %).

The Ms point (martensite transformation start temperature) can be calculated by the following formula:

$$Ms(° C.)=541-474C/(1-VF)-15Si-35Mn-17Cr-17Ni+19Al$$

In the above formula, VF is the volume fraction of ferrite, while C, Si, Mn, Cr, Ni, and Al are the amounts of addition of these elements (mass %).

Note that, it is difficult to directly measure the volume fraction of the ferrite phase during production of high strength steel sheet, so in the present invention, a small piece of the cold rolled steel sheet is cut out before running the sheet through the continuous annealing line, that small piece is annealed by the same temperature history as the case of running it through the continuous annealing line, the change in volume of the ferrite phase of the small piece is measured, the result is used to calculate a numerical value, and that value is used as the volume fraction VF of the ferrite. This measurement may be performed using the result of the first measurement operation when producing steel sheet under the same conditions. The value does not have to be measured each time. Measurement is performed again when greatly changing the production conditions. Of course, it is also possible to observe the microstructure of the actually produced steel sheet and feed back the results to the production the next time and on.

In the above-mentioned reheating from the Bs point or less than 500° C. to 500° C. or more, the start temperature is made the Bs point or less than 500° C. so as to cause the formation of bainite nuclei for consuming the defects in the austenite. The reheating temperature was made 500° C. or more so as to deactivate the transformation nuclei and avoid the formation of iron-based carbides induced by transformation excessively proceeding in the high temperature region.

In the above-mentioned reheating from the Ms point or less than 350° C. to 350° C. or more, the start temperature is made the Ms point or less than 350° C. so as to cause the formation of martensite nuclei for consuming the defects in the austenite. The reheating temperature was made 350° C. or more so as to avoid the formation of fine iron-based carbides obstructing the concentration of C at the austenite phase in the martensite and/or bainite due to being allowed to stand at less than 350° C.

The reason why performing the above-mentioned two-stage reheating in different temperature regions results in the residual austenite phase strikingly rising is not fully clear, but it is believed that the bainite nuclei and the martensite nuclei consume respectively different types of defects.

Due to the above processes, defects which can form starting sites of martensite transformation which are present in the residual austenite phase are consumed, only the austenite phase with its high degree of cleanliness selectively remains, and an extremely stable residual austenite phase is obtained. As a result, high strength steel sheet which has high ductility and stretch flangeability and which is excellent in shapeability is obtained.

The annealed steel sheet may be cold rolled by about 0.03 to 0.80% for the purpose of correcting the shape. At that time, if the cold rolling rate after annealing is too high, the soft ferrite phase will be work hardened and the ductility will greatly deteriorate, so the rolling rate is preferably made the above range.

The annealed steel sheet may be electrolytically galvanized to obtain high strength galvanized steel sheet. Further, the annealed steel sheet may be hot dip galvanized to obtain high strength galvanized steel sheet. In such a case, for example, it is possible to cool from the maximum heating temperature to room temperature in the annealing process, for example, down to 500° C., apply further reheating, then dip in a zinc bath for hot dip galvanization.

Further, during the secondary cooling during the above annealing treatment and while holding between 350 to 450° C. or after holding at 350 to 450° C., the steel sheet may be dipped in a galvanization bath to produce high strength galvanized steel sheet.

After the hot dip galvanization, it is possible to further treat the plating layer of the steel sheet surface to alloy it at a temperature of 470 to 650° C. By performing such alloying treatment, a Zn—Fe alloy obtained by the galvanized layer being alloyed is formed on the surface, and high strength galvanized steel sheet which is excellent in rust prevention is obtained.

This heating in the alloying treatment may be performed in place of the reheating from the Bs point or less than 500° C. to 500° C. or more or the reheating from the Ms point or less than 350° C. to 350° C. or more.

In performing the plating treatment, to improve the plating adhesion, for example, it is possible to plate the steel sheet before the annealing process by plating comprised of one or more elements selected from Ni, Cu, Co, and Fe. By performing such plating treatment by this method, high strength galvanized steel sheet which is formed with a galvanized layer on its surface, has high ductility and stretch flangeability, and has excellent shapeability is obtained.

The high strength steel sheet on the surface of which a galvanized layer is formed may further be formed with a film comprised of a P oxide and/or P-containing composite oxide.

EXAMPLES

Below, the high strength steel sheet and high strength galvanized steel sheet which are excellent in shapeability and the methods of production of the same of the present invention will be explained more specifically using examples. The present invention is not of course limited to the following examples and may be suitably changed in a range able to match with the gist of the present invention. These are all included in the technical scope of the present invention.

Slabs which have the chemical ingredients (compositions) of A to AG which are shown in Tables 1 and 2 were cast, then immediately after casting were hot rolled, cooled, coiled, and pickled under the conditions which are shown in Tables 3 to 5. After that, Experiments 5, 14, 19, 24, 29, 34, 39, 44, 49, 54, 59, 98, 102, and 119 left the hot rolled steel sheets as they were, while the other experiments cold rolled them under the conditions which are described in Tables 3 to 6 after pickling. After that, an annealing process was applied under the conditions which are shown in Tables 7 to 14 to obtain the steel sheets of Experiments 1 to 127.

TABLE 1

| Experiment | C mass % | Si mass % | Mn mass % | P mass % | S mass % | Al mass % | N mass % | O mass % |
|---|---|---|---|---|---|---|---|---|
| A | 0.107 | 1.33 | 1.56 | 0.020 | 0.0038 | 0.043 | 0.0035 | 0.0006 |
| B | 0.193 | 1.97 | 2.49 | 0.014 | 0.0009 | 0.027 | 0.0021 | 0.0016 |
| C | 0.107 | 0.99 | 2.02 | 0.017 | 0.0024 | 0.038 | 0.0030 | 0.0025 |
| D | 0.247 | 1.14 | 1.92 | 0.019 | 0.0034 | 0.005 | 0.0050 | 0.0029 |
| E | 0.191 | 1.05 | 1.41 | 0.015 | 0.0029 | 0.067 | 0.0030 | 0.0011 |
| F | 0.133 | 1.89 | 1.92 | 0.010 | 0.0046 | 0.038 | 0.0041 | 0.0022 |
| G | 0.203 | 1.02 | 1.51 | 0.014 | 0.0052 | 0.073 | 0.0024 | 0.0015 |
| H | 0.182 | 0.75 | 1.87 | 0.012 | 0.0037 | 0.263 | 0.0037 | 0.0019 |
| I | 0.084 | 1.51 | 2.79 | 0.018 | 0.0031 | 0.123 | 0.0013 | 0.0020 |
| J | 0.260 | 0.71 | 2.20 | 0.019 | 0.0014 | 0.302 | 0.0040 | 0.0025 |
| K | 0.199 | 1.19 | 1.89 | 0.018 | 0.0027 | 0.041 | 0.0060 | 0.0004 |
| L | 0.094 | 0.90 | 1.85 | 0.014 | 0.0034 | 0.056 | 0.0051 | 0.0013 |
| M | 0.183 | 2.00 | 1.99 | 0.007 | 0.0018 | 0.045 | 0.0041 | 0.0016 |
| N | 0.170 | 1.66 | 2.59 | 0.020 | 0.0008 | 0.015 | 0.0037 | 0.0016 |
| O | 0.140 | 0.74 | 1.45 | 0.013 | 0.0043 | 0.598 | 0.0055 | 0.0004 |
| P | 0.099 | 0.98 | 1.89 | 0.020 | 0.0007 | 0.044 | 0.0034 | 0.0006 |
| Q | 0.230 | 1.24 | 1.45 | 0.016 | 0.0010 | 0.068 | 0.0054 | 0.0028 |
| R | 0.119 | 1.39 | 2.27 | 0.016 | 0.0019 | 0.031 | 0.0060 | 0.0016 |
| S | 0.225 | 1.80 | 1.52 | 0.014 | 0.0042 | 0.032 | 0.0029 | 0.0011 |
| T | 0.142 | 0.99 | 2.17 | 0.011 | 0.0046 | 0.068 | 0.0021 | 0.0011 |
| U | 0.194 | 1.24 | 1.45 | 0.011 | 0.0015 | 0.053 | 0.0044 | 0.0019 |
| V | 0.133 | 2.27 | 2.55 | 0.017 | 0.0051 | 0.071 | 0.0056 | 0.0023 |
| W | 0.090 | 1.44 | 1.68 | 0.016 | 0.0044 | 0.054 | 0.0020 | 0.0007 |
| X | 0.101 | 1.95 | 1.54 | 0.009 | 0.0025 | 0.062 | 0.0058 | 0.0007 |
| Y | 0.114 | 1.62 | 2.70 | 0.010 | 0.0034 | 0.071 | 0.0020 | 0.0013 |
| Z | 0.150 | 1.06 | 3.16 | 0.010 | 0.0036 | 0.055 | 0.0018 | 0.0029 |
| AA | 0.015 | 1.05 | 2.00 | 0.013 | 0.0022 | 0.027 | 0.0035 | 0.0014 |
| AB | 0.097 | 0.06 | 1.97 | 0.012 | 0.0022 | 0.027 | 0.0032 | 0.0008 |
| AC | 0.101 | 1.05 | 0.52 | 0.015 | 0.0021 | 0.033 | 0.0033 | 0.0014 |
| AD | 0.093 | 1.68 | 2.67 | 0.002 | 0.0013 | 0.033 | 0.0076 | 0.0009 |
| AE | 0.152 | 0.75 | 2.07 | 0.013 | 0.0018 | 0.065 | 0.0015 | 0.0005 |
| AF | 0.148 | 1.72 | 1.55 | 0.007 | 0.0025 | 0.059 | 0.0080 | 0.0014 |
| AG | 0.209 | 0.89 | 2.50 | 0.007 | 0.0036 | 0.039 | 0.0057 | 0.0008 |

TABLE 2

| Experiment | Ti mass % | Nb mass % | B mass % | Cr mass % | Ni mass % | Cu mass % | Mo mass % | V mass % | Ca mass % | Ce mass % | Mg mass % | Zr mass % | Hf mass % | REM mass % | |
|---|---|---|---|---|---|---|---|---|---|---|---|---|---|---|---|
| A | | | | | | | | | | | | | | | Inv. ex. |
| B | | | | | | | | | | | | | | | Inv. ex. |
| C | | | | | | | | | | | | | | | Inv. ex. |
| D | | | | | | | | | | | | | | | Inv. ex. |
| E | 0.044 | | | | | | | | | | | | | | Inv. ex. |
| F | | 0.022 | | | | | | | | | | | | | Inv. ex. |
| G | | | 0.0019 | | | | | | | | | | | | Inv. ex. |
| H | | | | 0.49 | | | | | | | | | | | Inv. ex. |
| I | | | | | | | | | 0.0020 | | | | | | Inv. ex. |
| J | | | | | | | 0.25 | | | | | | | | Inv. ex. |
| K | | | | | | | | 0.105 | | | | | | | Inv. ex. |
| L | 0.023 | 0.013 | 0.0026 | 0.39 | | | 0.11 | | 0.0032 | 0.0010 | | | | | Inv. ex. |
| M | | | | | 0.65 | | | | | | | | | | Inv. ex. |
| N | | | | | | 0.24 | | | | | | | | | Inv. ex. |
| O | | | | | 1.00 | 0.60 | | | | | | | | | Inv. ex. |
| P | | | | | | | | | | | 0.0025 | | | | Inv. ex. |
| Q | | | | | | | | | | | | 0.0017 | | | Inv. ex. |
| R | | | | | | | | | | | | | 0.0019 | | Inv. ex. |
| S | | | | | | | | | | | | | | 0.0025 | Inv. ex. |
| T | | | | | | | | | | | | | | 0.0021 | Inv. ex. |
| U | 0.069 | | 0.0015 | | | | | | | | | | | | Inv. ex. |
| V | 0.005 | 0.035 | | | 0.23 | | | | 0.0019 | | | | | | Inv. ex. |
| W | | | 0.0009 | | | | | | | 0.0024 | | | | | Inv. ex. |
| X | | | | | 0.67 | | | 0.18 | | | | | | | Inv. ex. |
| Y | | | | | | | | | | | | | | | Inv. ex. |
| Z | | | | | | | | | | | | | | | Inv. ex. |
| AA | | | | | | | | | | | | | | | Comp. ex. |
| AB | | | | | | | | | | | | | | | Comp. ex. |
| AC | | | | | | | | | | | | | | | Comp. ex. |
| AD | | | | | | | | | | | | | | | Inv. ex. |
| AE | | | | | | | | | | | | | | | Inv. ex. |
| AF | | | | | | | | | | | | | | | Inv. ex. |
| AG | | | | | | | | | | | | | | | Inv. ex. |

TABLE 3

| Experiment | Chemical ingredients | Slab heating temp. °C | Ar3 transformation point °C | Hot rolling end temp. °C | Coiling temp. °C | Cold rolling rate % | |
|---|---|---|---|---|---|---|---|
| 1 | A | 1265 | 769 | 915 | 584 | 52 | Inv. ex. |
| 2 | A | 1215 | 769 | 901 | 600 | 52 | Inv. ex. |
| 3 | A | 1185 | 769 | 952 | 612 | 52 | Inv. ex. |
| 4 | A | 1265 | 769 | 952 | 583 | 52 | Inv. ex. |
| 5 | A | 1225 | 769 | 926 | 562 | 0 | Inv. ex. |
| 6 | B | 1195 | 676 | 943 | 618 | 40 | Inv. ex. |
| 7 | B | 1170 | 676 | 910 | 638 | 40 | Inv. ex. |
| 8 | B | 1240 | 676 | 925 | 567 | 40 | Inv. ex. |
| 9 | B | 1185 | 676 | 929 | 528 | 40 | Inv. ex. |
| 10 | C | 1205 | 715 | 912 | 632 | 52 | Inv. ex. |
| 11 | C | 1200 | 715 | 900 | 671 | 52 | Inv. ex. |
| 12 | C | 1175 | 715 | 892 | 695 | 52 | Inv. ex. |
| 13 | C | 1205 | 715 | 885 | 614 | 52 | Inv. ex. |
| 14 | C | 1245 | 715 | 923 | 605 | 0 | Inv. ex. |
| 15 | D | 1190 | 682 | 935 | 660 | 52 | Inv. ex. |
| 16 | D | 1275 | 682 | 904 | 546 | 52 | Inv. ex. |
| 17 | D | 1235 | 682 | 930 | 556 | 52 | Inv. ex. |
| 18 | D | 1250 | 682 | 949 | 613 | 52 | Inv. ex. |
| 19 | D | 1195 | 682 | 905 | 568 | 0 | Inv. ex. |
| 20 | E | 1225 | 747 | 913 | 598 | 38 | Inv. ex. |
| 21 | E | 1240 | 747 | 908 | 682 | 38 | Inv. ex. |
| 22 | E | 1240 | 747 | 898 | 563 | 67 | Inv. ex. |
| 23 | E | 1245 | 747 | 908 | 645 | 67 | Inv. ex. |
| 24 | E | 1270 | 747 | 892 | 620 | 0 | Inv. ex. |
| 25 | F | 1180 | 745 | 944 | 652 | 50 | Inv. ex. |
| 26 | F | 1230 | 745 | 893 | 639 | 50 | Inv. ex. |
| 27 | F | 1215 | 745 | 928 | 542 | 50 | Inv. ex. |
| 28 | F | 1215 | 745 | 894 | 687 | 50 | Comp. ex. |
| 29 | F | 1210 | 745 | 943 | 577 | 0 | Inv. ex. |
| 30 | G | 1170 | 734 | 939 | 681 | 52 | Inv. ex. |
| 31 | G | 1180 | 734 | 933 | 619 | 52 | Inv. ex. |

TABLE 3-continued

| Experiment | Chemical ingredients | Slab heating temp. ° C. | Ar3 transformation point ° C. | Hot rolling end temp. ° C. | Coiling temp. ° C. | Cold rolling rate % | |
|---|---|---|---|---|---|---|---|
| 32 | G | 1200 | 734 | 893 | 661 | 52 | Comp. ex. |
| 33 | G | 1230 | 734 | 917 | 594 | 52 | Inv. ex. |
| 34 | G | 1255 | 734 | 931 | 594 | 0 | Inv. ex. |
| 35 | H | 1235 | 686 | 890 | 643 | 38 | Inv. ex. |

TABLE 4

| Experiment | Chemical ingredients | Slab heating temp. ° C. | Ar3 transformation point ° C. | Hot rolling end temp. ° C. | Coiling temp. ° C. | Cold rolling rate % | |
|---|---|---|---|---|---|---|---|
| 36 | H | 1240 | 686 | 886 | 554 | 38 | Inv. ex. |
| 37 | H | 1225 | 686 | 942 | 572 | 38 | Comp. ex. |
| 38 | H | 1245 | 686 | 929 | 557 | 38 | Inv. ex. |
| 39 | H | 1215 | 686 | 905 | 570 | 0 | Inv. ex. |
| 40 | I | 1205 | 673 | 885 | 528 | 68 | Inv. ex. |
| 41 | I | 1175 | 673 | 951 | 643 | 68 | Inv. ex. |
| 42 | I | 1205 | 673 | 926 | 559 | 68 | Comp. ex. |
| 43 | I | 1265 | 673 | 953 | 566 | 68 | Inv. ex. |
| 44 | I | 1235 | 673 | 910 | 615 | 0 | Inv. ex. |
| 45 | J | 1265 | 642 | 949 | 612 | 36 | Inv. ex. |
| 46 | J | 1215 | 642 | 938 | 618 | 36 | Inv. ex. |
| 47 | J | 1250 | 642 | 898 | 638 | 36 | Comp. ex. |
| 48 | J | 1295 | 642 | 856 | 677 | 52 | Inv. ex. |
| 49 | J | 1215 | 642 | 933 | 588 | 0 | Inv. ex. |
| 50 | K | 1205 | 704 | 930 | 658 | 71 | Inv. ex. |
| 51 | K | 1230 | 704 | 930 | 615 | 71 | Inv. ex. |
| 52 | K | 1195 | 704 | 942 | 672 | 71 | Comp. ex. |
| 53 | K | 1265 | 704 | 914 | 611 | 71 | Inv. ex. |
| 54 | K | 1240 | 704 | 950 | 597 | 0 | Inv. ex. |
| 55 | L | 1190 | 710 | 919 | 616 | 50 | Inv. ex. |
| 56 | L | 1190 | 710 | 950 | 669 | 50 | Inv. ex. |
| 57 | L | 1270 | 710 | 902 | 693 | 50 | Comp. ex. |
| 58 | L | 1200 | 710 | 891 | 679 | 50 | Inv. ex. |
| 59 | L | 1230 | 710 | 924 | 582 | 0 | Inv. ex. |
| 60 | M | 1270 | 697 | 944 | 660 | 52 | Inv. ex. |
| 61 | M | 1180 | 697 | 931 | 581 | 52 | Inv. ex. |
| 62 | M | 1255 | 697 | 883 | 569 | 52 | Comp. ex. |
| 63 | M | 1245 | 697 | 945 | 605 | 52 | Inv. ex. |
| 64 | N | 1185 | 652 | 933 | 675 | 52 | Inv. ex. |
| 65 | N | 1225 | 652 | 895 | 580 | 52 | Inv. ex. |
| 66 | N | 1265 | 652 | 925 | 628 | 52 | Comp. ex. |
| 67 | N | 1220 | 652 | 914 | 681 | 52 | Inv. ex. |
| 68 | O | 1225 | 704 | 949 | 613 | 52 | Inv. ex. |
| 69 | O | 1255 | 704 | 877 | 690 | 52 | Inv. ex. |
| 70 | O | 1220 | 704 | 903 | 671 | 52 | Comp. ex. |

TABLE 5

| Experiment | Chemical ingredients | Slab heating temp. ° C. | Ar3 transformation point ° C. | Hot rolling end temp. ° C. | Coiling temp. ° C. | Cold rolling rate % | |
|---|---|---|---|---|---|---|---|
| 71 | O | 1215 | 704 | 915 | 684 | 52 | Inv. ex. |
| 72 | P | 1230 | 730 | 932 | 609 | 52 | Inv. ex. |
| 73 | P | 1180 | 730 | 923 | 603 | 52 | Inv. ex. |
| 74 | P | 1230 | 730 | 903 | 639 | 52 | Comp. ex. |
| 75 | P | 1215 | 730 | 927 | 614 | 52 | Inv. ex. |
| 76 | Q | 1180 | 737 | 890 | 646 | 52 | Inv. ex. |
| 77 | Q | 1270 | 737 | 934 | 671 | 52 | Inv. ex. |
| 78 | Q | 1260 | 737 | 913 | 664 | 52 | Comp. ex. |
| 79 | Q | 1280 | 737 | 947 | 591 | 52 | Inv. ex. |
| 80 | R | 1190 | 701 | 909 | 642 | 40 | Inv. ex. |
| 81 | R | 1245 | 701 | 907 | 629 | 40 | Inv. ex. |
| 82 | R | 1205 | 701 | 886 | 568 | 52 | Comp. ex. |

TABLE 5-continued

| Experiment | Chemical ingredients | Slab heating temp. °C. | Ar3 transformation point °C. | Hot rolling end temp. °C. | Coiling temp. °C. | Cold rolling rate % | |
|---|---|---|---|---|---|---|---|
| 83 | R | 1210 | 701 | 924 | 602 | 52 | Inv. ex. |
| 84 | S | 1215 | 749 | 900 | 648 | 52 | Inv. ex. |
| 85 | S | 1180 | 749 | 918 | 573 | 52 | Inv. ex. |
| 86 | S | 1210 | 749 | 931 | 578 | 52 | Inv. ex. |
| 87 | S | 1265 | 749 | 920 | 589 | 52 | Inv. ex. |
| 88 | T | 1245 | 691 | 942 | 625 | 47 | Inv. ex. |
| 89 | T | 1275 | 691 | 889 | 652 | 47 | Inv. ex. |
| 90 | T | 1275 | 691 | 907 | 585 | 47 | Inv. ex. |
| 91 | T | 1230 | 691 | 897 | 558 | 47 | Inv. ex. |
| 92 | U | 1225 | 748 | 904 | 551 | 67 | Inv. ex. |
| 93 | U | 1190 | 748 | 904 | 608 | 67 | Inv. ex. |
| 94 | U | 1205 | 748 | 897 | 591 | 52 | Inv. ex. |
| 95 | U | 1275 | 748 | 930 | 607 | 52 | Inv. ex. |
| 96 | V | 1185 | 691 | 909 | 678 | 52 | Inv. ex. |
| 97 | V | 1200 | 691 | 899 | 645 | 52 | Inv. ex. |
| 98 | V | 1215 | 691 | 901 | 650 | 0 | Inv. ex. |
| 99 | V | 1230 | 691 | 917 | 582 | 52 | Inv. ex. |
| 100 | W | 1260 | 768 | 888 | 664 | 52 | Inv. ex. |
| 101 | W | 1190 | 768 | 907 | 657 | 52 | Inv. ex. |
| 102 | W | 1195 | 768 | 921 | 564 | 0 | Inv. ex. |
| 103 | W | 1280 | 768 | 914 | 606 | 52 | Inv. ex. |
| 104 | X | 1235 | 755 | 910 | 634 | 52 | Inv. ex. |
| 105 | X | 1275 | 755 | 952 | 604 | 52 | Inv. ex. |

TABLE 6

| Experiment | Chemical ingredients | Slab heating temp. °C. | Ar3 transformation point °C. | Hot rolling end temp. °C. | Coiling temp. °C. | Cold rolling rate % | |
|---|---|---|---|---|---|---|---|
| 106 | X | 1210 | 755 | 900 | 621 | 52 | Inv. ex. |
| 107 | X | 1280 | 755 | 939 | 616 | 52 | Inv. ex. |
| 108 | Y | 1200 | 673 | 886 | 673 | 67 | Inv. ex. |
| 109 | Y | 1185 | 673 | 925 | 652 | 67 | Inv. ex. |
| 110 | Y | 1175 | 673 | 940 | 673 | 43 | Inv. ex. |
| 111 | Y | 1185 | 673 | 953 | 563 | 43 | Inv. ex. |
| 112 | Z | 1225 | 599 | 929 | 643 | 52 | Inv. ex. |
| 113 | Z | 1185 | 599 | 915 | 694 | 52 | Inv. ex. |
| 114 | Z | 1220 | 599 | 902 | 683 | 52 | Inv. ex. |
| 115 | Z | 1275 | 599 | <u>735</u> | 666 | 52 | Comp. ex. |
| 116 | AA | 1190 | 748 | 935 | 623 | 52 | Comp. ex. |
| 117 | AB | 1205 | 692 | 889 | 622 | 52 | Comp. ex. |
| 118 | AC | 1175 | 857 | 894 | 660 | 52 | Comp. ex. |
| 119 | B | 1210 | 676 | 925 | 566 | 0 | Inv. ex. |
| 120 | AD | 1200 | 682 | 866 | 588 | 50 | Inv. ex. |
| 121 | AD | 1225 | 682 | 903 | 600 | 50 | Inv. ex. |
| 122 | AE | 1230 | 689 | 889 | 601 | 50 | Inv. ex. |
| 123 | AE | 1220 | 689 | 887 | 611 | 50 | Inv. ex. |
| 124 | AF | 1220 | 770 | 894 | 621 | 50 | Inv. ex. |
| 125 | AF | 1215 | 770 | 922 | 588 | 50 | Inv. ex. |
| 126 | AG | 1205 | 634 | 902 | 599 | 50 | Inv. ex. |
| 127 | AG | 1210 | 634 | 892 | 591 | 50 | Inv. ex. |

TABLE 7

| | | | Heating process | | First cooling process | Second cooling process | |
|---|---|---|---|---|---|---|---|
| Experiment | Chemical ingredients | Steel type | Heating rate °C./sec | Max. heating temp. °C. | Average cooling rate °C./sec | Average cooling rate °C./sec | |
| 1 | A | CR | 0.3 | 920 | 3.3 | 34 | Inv. ex. |
| 2 | A | CR | 0.3 | 812 | 3.1 | 32 | Inv. ex. |
| 3 | A | GA | 0.3 | 816 | 3.1 | 28 | Inv. ex. |

TABLE 7-continued

| Experiment | Chemical ingredients | Steel type | Heating process Heating rate °C./sec | Heating process Max. heating temp. °C. | First cooling process Average cooling rate °C./sec | Second cooling process Average cooling rate °C./sec | |
|---|---|---|---|---|---|---|---|
| 4 | A | GI | 0.3 | 821 | 3.4 | 29 | Inv. ex. |
| 5 | A | HR-GA | 0.3 | 812 | 3.3 | 33 | Inv. ex. |
| 6 | B | CR | 0.3 | 819 | 1.7 | 27 | Inv. ex. |
| 7 | B | CR | 0.3 | 825 | 1.6 | 28 | Inv. ex. |
| 8 | B | CR | 0.3 | 826 | 1.5 | 31 | Inv. ex. |
| 9 | B | GA | 0.3 | 823 | 2.5 | 27 | Inv. ex. |
| 10 | C | CR | 0.5 | 846 | 2.5 | 13 | Inv. ex. |
| 11 | C | CR | 0.5 | 836 | 2.6 | 11 | Inv. ex. |
| 12 | C | CR | 15 | 831 | 3.2 | 11 | Inv. ex. |
| 13 | C | EG | 0.5 | 845 | 3.4 | 10 | Inv. ex. |
| 14 | C | HR | 0.4 | 845 | 3.1 | 13 | Inv. ex. |
| 15 | D | CR | 0.7 | 793 | 6.2 | 10 | Inv. ex. |
| 16 | D | CR | 0.7 | 782 | 4.5 | 10 | Inv. ex. |
| 17 | D | CR | 8 | 781 | 3.6 | 8 | Inv. ex. |
| 18 | D | GI | 0.7 | 786 | 4.4 | 10 | Inv. ex. |
| 19 | D | HR | 0.7 | 784 | 3.7 | 8 | Inv. ex. |
| 20 | E | CR | 0.7 | 822 | 2.6 | 7 | Inv. ex. |
| 21 | E | CR | 0.7 | 829 | 3.1 | 12 | Inv. ex. |
| 22 | E | GA | 0.7 | 823 | 2.5 | 8 | Inv. ex. |
| 23 | E | EG | 0.7 | 821 | 2.5 | 12 | Inv. ex. |
| 24 | E | HR-GA | 0.7 | 816 | 2.6 | 10 | Inv. ex. |
| 25 | F | CR | 0.7 | 834 | 2.5 | 8 | Inv. ex. |
| 26 | F | CR | 0.7 | 898 | 3.5 | 7 | Inv. ex. |
| 27 | F | CR | 0.7 | 892 | 2.9 | 46 | Inv. ex. |
| 28 | F | CR | 0.7 | 1076 | 2.7 | 52 | Comp. ex. |
| 29 | F | HR | 0.7 | 898 | 2.7 | 55 | Inv. ex. |
| 30 | G | CR | 0.5 | 793 | 3.3 | 31 | Inv. ex. |
| 31 | G | CR | 0.5 | 789 | 2.8 | 35 | Inv. ex. |
| 32 | G | CR | 0.5 | 730 | 3.2 | 32 | Comp. ex. |
| 33 | G | EG | 0.5 | 783 | 2.7 | 30 | Inv. ex. |
| 34 | G | HR-GA | 0.5 | 800 | 3.5 | 30 | Inv. ex. |
| 35 | H | CR | 0.5 | 780 | 4.9 | 33 | Inv. ex. |

TABLE 8

| Experiment | Chemical ingredients | Steel type | Heating process Heating rate °C./sec | Heating process Max. heating temp. °C. | First cooling process Average cooling rate °C./sec | Second cooling process Average cooling rate °C./sec | |
|---|---|---|---|---|---|---|---|
| 36 | H | CR | 0.5 | 889 | 5.3 | 31 | Inv. ex. |
| 37 | H | CR | 0.5 | 886 | 31 | 30 | Comp. ex. |
| 38 | H | GA | 0.5 | 788 | 5.4 | 30 | Inv. ex. |
| 39 | H | HR | 0.5 | 790 | 2.6 | 33 | Inv. ex. |
| 40 | I | CR | 0.5 | 817 | 3.1 | 26 | Inv. ex. |
| 41 | I | CR | 0.6 | 817 | 3.2 | 34 | Inv. ex. |
| 42 | I | CR | 0.5 | 818 | 0.2 | 33 | Comp. ex. |
| 43 | I | GI | 0.5 | 811 | 2.5 | 35 | Inv. ex. |
| 44 | I | HR-GA | 0.5 | 828 | 3.5 | 30 | Inv. ex. |
| 45 | J | CR | 0.4 | 840 | 2.5 | 34 | Inv. ex. |
| 46 | J | CR | 0.4 | 835 | 3.3 | 102 | Inv. ex. |
| 47 | J | CR | 0.4 | 856 | 3.6 | 1 | Comp. ex. |
| 48 | J | GI | 0.4 | 835 | 2.4 | 33 | Inv. ex. |
| 49 | J | HR-GA | 0.4 | 846 | 2.7 | 31 | Inv. ex. |
| 50 | K | CR | 0.5 | 810 | 3.3 | 59 | Inv. ex. |
| 51 | K | CR | 0.5 | 793 | 2.7 | 65 | Inv. ex. |
| 52 | K | CR | 0.5 | 804 | 2.7 | 57 | Comp. ex. |
| 53 | K | GI | 0.5 | 796 | 3.1 | 61 | Inv. ex. |
| 54 | K | HR-GA | 0.5 | 799 | 3.1 | 63 | Inv. ex. |
| 55 | L | CR | 0.4 | 821 | 2.9 | 56 | Inv. ex. |
| 56 | L | CR | 0.4 | 837 | 2.9 | 61 | Inv. ex. |
| 57 | L | CR | 0.4 | 828 | 3.5 | 58 | Comp. ex. |
| 58 | L | GI | 0.4 | 837 | 2.8 | 66 | Inv. ex. |
| 59 | L | HR-GA | 0.4 | 826 | 3.1 | 53 | Inv. ex. |

TABLE 8-continued

| Experiment | Chemical ingredients | Steel type | Heating process Heating rate °C./sec | Heating process Max. heating temp. °C. | First cooling process Average cooling rate °C./sec | Second cooling process Average cooling rate °C./sec | |
|---|---|---|---|---|---|---|---|
| 60 | M | CR | 0.4 | 829 | 3.0 | 57 | Inv. ex. |
| 61 | M | CR | 0.4 | 824 | 3.5 | 11 | Inv. ex. |
| 62 | M | CR | 0.4 | 823 | 3.4 | 59 | Comp. ex. |
| 63 | M | GA | 0.4 | 815 | 2.7 | 64 | Inv. ex. |
| 64 | N | CR | 0.4 | 827 | 3.0 | 27 | Inv. ex. |
| 65 | N | CR | 0.4 | 821 | 3.1 | 31 | Inv. ex. |
| 66 | N | CR | 0.4 | 810 | 3.5 | 29 | Comp. ex. |
| 67 | N | GI | 0.4 | 818 | 2.6 | 31 | Inv. ex. |
| 68 | O | CR | 0.5 | 953 | 3.8 | 8 | Inv. ex. |
| 69 | O | CR | 0.5 | 943 | 3.3 | 30 | Inv. ex. |
| 70 | O | CR | 0.5 | 944 | 3.7 | 32 | Comp. ex. |

TABLE 9

| Experiment | Chemical ingredients | Steel type | Heating process Heating rate °C./sec | Heating process Max. heating temp. °C. | First cooling process Average cooling rate °C./sec | Second cooling process Average cooling rate °C./sec | |
|---|---|---|---|---|---|---|---|
| 71 | O | GA | 0.5 | 939 | 2.7 | 41 | Inv. ex. |
| 72 | P | CR | 0.4 | 849 | 7.8 | 27 | Inv. ex. |
| 73 | P | CR | 0.3 | 838 | 2.6 | 30 | Inv. ex. |
| 74 | P | CR | 0.4 | 842 | 2.9 | 33 | Comp. ex. |
| 75 | P | GA | 0.4 | 841 | 2.6 | 8 | Inv. ex. |
| 76 | Q | CR | 0.4 | 794 | 2.8 | 28 | Inv. ex. |
| 77 | Q | CR | 0.4 | 801 | 3.4 | 30 | Inv. ex. |
| 78 | Q | CR | 0.4 | 800 | 2.7 | 26 | Comp. ex. |
| 79 | Q | GA | 0.4 | 806 | 2.8 | 29 | Inv. ex. |
| 80 | R | CR | 0.4 | 817 | 3.2 | 27 | Inv. ex. |
| 81 | R | CR | 0.4 | 803 | 3.3 | 30 | Inv. ex. |
| 82 | R | CR | 0.4 | 800 | 2.6 | 30 | Comp. ex. |
| 83 | R | GI | 0.4 | 807 | 2.7 | 33 | Inv. ex. |
| 84 | S | CR | 0.4 | 798 | 1.9 | 27 | Inv. ex. |
| 85 | S | CR | 0.4 | 806 | 1.8 | 128 | Inv. ex. |
| 86 | S | GA | 0.4 | 801 | 2.4 | 35 | Inv. ex. |
| 87 | S | GI | 0.4 | 804 | 2.1 | 28 | Inv. ex. |
| 88 | T | CR | 0.4 | 835 | 2.1 | 32 | Inv. ex. |
| 89 | T | CR | 0.4 | 820 | 1.6 | 34 | Inv. ex. |
| 90 | T | GA | 0.5 | 826 | 2.4 | 32 | Inv. ex. |
| 91 | T | EG | 0.4 | 833 | 1.9 | 29 | Inv. ex. |
| 92 | U | CR | 0.4 | 785 | 4.8 | 28 | Inv. ex. |
| 93 | U | CR | 0.4 | 771 | 5.4 | 32 | Inv. ex. |
| 94 | U | GA | 0.4 | 787 | 4.7 | 26 | Inv. ex. |
| 95 | U | EG | 0.4 | 775 | 5.2 | 27 | Inv. ex. |
| 96 | V | CR | 0.4 | 865 | 5.0 | 47 | Inv. ex. |
| 97 | V | CR | 0.4 | 880 | 5.1 | 49 | Inv. ex. |
| 98 | V | HR | 0.4 | 872 | 4.8 | 52 | Inv. ex. |
| 99 | V | GA | 0.4 | 867 | 5.2 | 54 | Inv. ex. |
| 100 | W | CR | 0.2 | 882 | 5.1 | 50 | Inv. ex. |
| 101 | W | CR | 0.2 | 796 | 5.3 | 51 | Inv. ex. |
| 102 | W | HR-GA | 0.2 | 793 | 4.6 | 47 | Inv. ex. |
| 103 | W | GI | 0.2 | 804 | 5.1 | 54 | Inv. ex. |
| 104 | X | CR | 0.5 | 852 | 5.4 | 47 | Inv. ex. |
| 105 | X | CR | 0.5 | 847 | 4.9 | 53 | Inv. ex. |

TABLE 10

| Experiment | Chemical ingredients | Steel type | Heating process Heating rate °C./sec | Heating process Max. heating temp. °C. | First cooling process Average cooling rate °C./sec | Second cooling process Average cooling rate °C./sec | |
|---|---|---|---|---|---|---|---|
| 106 | X | CR | 17 | 853 | 4.6 | 53 | Inv. ex. |
| 107 | X | EG | 0.5 | 857 | 5.0 | 47 | Inv. ex. |
| 108 | Y | CR | 0.5 | 810 | 4.7 | 50 | Inv. ex. |
| 109 | Y | CR | 0.5 | 791 | 3.1 | 46 | Inv. ex. |
| 110 | Y | GA | 0.5 | 803 | 2.5 | 50 | Inv. ex. |
| 111 | Y | CR | 18 | 807 | 3.5 | 43 | Inv. ex. |
| 112 | Z | CR | 0.5 | 759 | 2.8 | 51 | Inv. ex. |
| 113 | Z | CR | 0.5 | 759 | 2.7 | 48 | Inv. ex. |
| 114 | Z | EG | 0.5 | 747 | 3.4 | 51 | Inv. ex. |
| 115 | Z | CR | 0.5 | 757 | 2.8 | 28 | Comp. ex. |
| 116 | AA | CR | 0.5 | 799 | 3.1 | 30 | Comp. ex. |
| 117 | AB | CR | 0.5 | 795 | 3.1 | 27 | Comp. ex. |
| 118 | AC | CR | 0.5 | 790 | 3.3 | 30 | Comp. ex. |
| 119 | B | HR | 0.4 | 827 | 1.7 | 34 | Inv. ex. |
| 120 | AD | CR | 0.4 | 819 | 1.8 | 26 | Inv. ex. |
| 121 | AD | GA | 0.8 | 842 | 2.8 | 27 | Inv. ex. |
| 122 | AE | CR | 0.7 | 943 | 3.1 | 63 | Inv. ex. |
| 123 | AE | GA | 0.7 | 846 | 1.9 | 24 | Inv. ex. |
| 124 | AF | CR | 0.7 | 899 | 2.1 | 33 | Inv. ex. |
| 125 | AF | GA | 0.7 | 928 | 2.2 | 65 | Inv. ex. |
| 126 | AG | CR | 0.7 | 793 | 2.1 | 68 | Inv. ex. |
| 127 | AG | GA | 0.7 | 809 | 2.0 | 61 | Inv. ex. |

TABLE 11

| Experiment | Reheating process 1 Cooling stop temp. °C. | Reheating process 1 Reheat stop temp. °C. | Reheating process 2 Cooling stop temp. °C. | Reheating process 2 Reheat stop temp. °C. | Reheating process 3 Cooling stop temp. °C. | Reheating process 3 Reheat stop temp. °C. | Holding process Holding time Sec. | Reheating process 4 Cooling stop temp. °C. | Reheating process 4 Reheat stop temp. °C. | Reheating process 5 Cooling stop temp. °C. | Reheating process 5 Reheat stop temp. °C. | Alloying process Alloying temp. °C. | Bainite transformation start temp. (Bs) °C. | Martensite transformation start temp. (Ms) °C. | |
|---|---|---|---|---|---|---|---|---|---|---|---|---|---|---|---|
| 1 | 464 | 541 | | | 292 | 360 | 244 | | | | | | 598 | 412 | Inv. ex. |
| 2 | 458 | 525 | | | 335 | 379 | 273 | | | 318 | 378 | | 567 | 346 | Inv. ex. |
| 3 | 455 | 520 | | | 322 | 397 | 240 | | | | | 520 | 559 | 370 | Inv. ex. |
| 4 | 456 | 547 | | | 328 | 397 | 253 | | | | | | 560 | 360 | Inv. ex. |
| 5 | 460 | 514 | | | 304 | 414 | 254 | | | | | 514 | 571 | 341 | Inv. ex. |
| 6 | 429 | 527 | | | 273 | 417 | 236 | | | | | | 440 | 279 | Inv. ex. |
| 7 | 411 | 520 | 421 | 518 | 254 | 421 | 279 | 423 | 518 | | | | 436 | 280 | Inv. ex. |
| 8 | 441 | 516 | | | 267 | 392 | 243 | | | | | | 450 | 299 | Inv. ex. |
| 9 | 422 | 534 | | | 234 | 373 | 56 | | | | | 477 | 434 | 271 | Inv. ex. |
| 10 | 483 | 513 | | | 311 | 385 | 279 | | | | | | 570 | 402 | Inv. ex. |
| 11 | 490 | 548 | | | 291 | 421 | 241 | | | | | | 566 | 403 | Inv. ex. |
| 12 | | | | | 312 | 412 | 218 | 397 | 505 | | | | 568 | 387 | Inv. ex. |
| 13 | 495 | 510 | | | 316 | 379 | 215 | | | | | | 572 | 395 | Inv. ex. |
| 14 | 459 | 520 | | | 331 | 370 | 237 | | | | | | 570 | 392 | Inv. ex. |
| 15 | 454 | 546 | | | 283 | 358 | 235 | | | | | | 504 | 295 | Inv. ex. |
| 16 | | | | | | | 245 | 378 | 526 | 318 | 378 | | 505 | 280 | Inv. ex. |
| 17 | 475 | 536 | | | 253 | 387 | 260 | | | | | | 497 | 280 | Inv. ex. |
| 18 | 482 | 526 | | | 263 | 390 | 284 | | | | | | 502 | 291 | Inv. ex. |
| 19 | 476 | 534 | | | 255 | 362 | 216 | | | | | | 500 | 284 | Inv. ex. |
| 20 | 476 | 547 | | | 308 | 400 | 54 | | | | | | 554 | 321 | Inv. ex. |
| 21 | 458 | 545 | | | 305 | 406 | 60 | | | | | | 565 | 324 | Inv. ex. |
| 22 | 489 | 551 | | | 334 | 400 | 64 | 425 | 520 | | | 520 | 582 | 345 | Inv. ex. |
| 23 | 484 | 519 | | | 294 | 369 | 56 | | | | | | 577 | 334 | Inv. ex. |
| 24 | 453 | 526 | | | 318 | 388 | 71 | 388 | 504 | | | 504 | 565 | 326 | Inv. ex. |
| 25 | 477 | 546 | | | 314 | 424 | 60 | | | | | | 510 | 342 | Inv. ex. |
| 26 | 464 | 545 | | | 326 | 359 | 212 | | | | | | 537 | 368 | Inv. ex. |
| 27 | | | | | 344 | 383 | 472 | 407 | 511 | | | | 532 | 378 | Inv. ex. |
| 28 | 478 | 521 | | | 336 | 404 | 246 | | | | | | 545 | 384 | Comp. ex. |
| 29 | 471 | 534 | | | 292 | 416 | 216 | | | | | | 532 | 371 | Inv. ex. |
| 30 | 463 | 531 | | | 225 | 362 | 64 | | | | | | 526 | 265 | Inv. ex. |
| 31 | | | | | 254 | 379 | 267 | 411 | 520 | | | | 545 | 290 | Inv. ex. |
| 32 | 483 | 509 | | | 191 | 366 | 532 | | | | | | 504 | 219 | Comp. ex. |
| 33 | 488 | 505 | | | 232 | 358 | 210 | | | | | | 510 | 236 | Inv. ex. |

TABLE 11-continued

| Experiment | Reheating process 1 | | Reheating process 2 | | Reheating process 3 | | Holding process Holding time Sec. | Reheating process 4 | | Reheating process 5 | | Alloying process Alloying temp. °C. | Bainite transformation start temp. (Bs) °C. | Martensite transformation start temp. (Ms) °C. | |
|---|---|---|---|---|---|---|---|---|---|---|---|---|---|---|---|
| | Cooling stop temp. °C. | Reheat stop temp. °C. | Cooling stop temp. °C. | Reheat stop temp. °C. | Cooling stop temp. °C. | Reheat stop temp. °C. | | Cooling stop temp. °C. | Reheat stop temp. °C. | Cooling stop temp. °C. | Reheat stop temp. °C. | | | | |
| 34 | 466 | 517 | 483 | 518 | 262 | 374 | 261 | | | | | 518 | 523 | 292 | Inv. ex. |
| 35 | 463 | 528 | | | 326 | 414 | 237 | | | | | | 522 | 331 | Inv. ex. |

TABLE 12

| Experiment | Reheating process 1 | | Reheating process 2 | | Reheating process 3 | | Holding process Holding time Sec. | Reheating process 4 | | Reheating process 5 | | Alloying process Alloying temp. °C. | Bainite transformation start temp. (Bs) °C. | Martensite transformation start temp. (Ms) °C. | |
|---|---|---|---|---|---|---|---|---|---|---|---|---|---|---|---|
| | Cooling stop temp. °C. | Reheat stop temp. °C. | Cooling stop temp. °C. | Reheat stop temp. °C. | Cooling stop temp. °C. | Reheat stop temp. °C. | | Cooling stop temp. °C. | Reheat stop temp. °C. | Cooling stop temp. °C. | Reheat stop temp. °C. | | | | |
| 36 | 488 | 546 | | | | | 276 | 419 | 519 | 318 | 378 | | 542 | 355 | Inv. ex. |
| 37 | 476 | 531 | | | 331 | 399 | 253 | | | | | | 563 | 376 | Comp. ex. |
| 38 | 445 | 543 | 451 | 501 | 239 | 368 | 257 | | | | | 501 | 469 | 264 | Inv. ex. |
| 39 | 447 | 504 | | | | | 216 | | | 318 | 378 | | 500 | 295 | Inv. ex. |
| 40 | 443 | 526 | | | 338 | 408 | 368 | | | | | | 464 | 349 | Inv. ex. |
| 41 | 452 | 552 | | | 312 | 422 | 444 | | | | | | 481 | 356 | Inv. ex. |
| 42 | | | | | 276 | 387 | 431 | 408 | 517 | | | | 451 | 308 | Comp. ex. |
| 43 | 460 | 511 | | | 315 | 402 | 339 | | | | | | 473 | 344 | Inv. ex. |
| 44 | 454 | 543 | | | 313 | 369 | 388 | | | | | 543 | 479 | 352 | Inv. ex. |
| 45 | 482 | 530 | | | 248 | 409 | 258 | | | | | | 495 | 260 | Inv. ex. |
| 46 | 471 | 533 | | | 267 | 416 | 255 | 417 | 525 | 319 | 379 | | 499 | 267 | Inv. ex. |
| 47 | 451 | 502 | | | <u>285</u> | 404 | 287 | | | | | | 338 | 3 | Comp. ex. |
| 48 | 481 | 532 | | | | | 280 | | | 250 | 377 | | 506 | 278 | Inv. ex. |
| 49 | 492 | 532 | | | 285 | 355 | 2245 | | | | | 476 | 514 | 290 | Inv. ex. |
| 50 | 488 | 545 | | | 308 | 356 | 357 | | | | | | 534 | 330 | Inv. ex. |
| 51 | 464 | 536 | | | 232 | 358 | 225 | | | | | | 471 | 269 | Inv. ex. |
| 52 | — | — | — | — | — | — | 253 | — | — | — | — | | 526 | 315 | Comp. ex. |
| 53 | 466 | 540 | | | 289 | 399 | 277 | | | | | | 503 | 305 | Inv. ex. |
| 54 | 478 | 543 | | | 280 | 386 | 242 | 401 | 522 | | | 522 | 512 | 292 | Inv. ex. |
| 55 | 472 | 552 | 482 | 512 | 297 | 386 | 74 | | | | | | 553 | 383 | Inv. ex. |
| 56 | 480 | 510 | | | 344 | 363 | 74 | | | | | | 560 | 391 | Inv. ex. |
| 57 | 440 | 510 | — | — | — | — | 225 | — | — | — | — | | 556 | 384 | Comp. ex. |
| 58 | 462 | 527 | | | 306 | 381 | 217 | | | | | | 561 | 396 | Inv. ex. |
| 59 | 493 | 547 | | | 311 | 372 | 236 | 406 | 503 | | | 503 | 566 | 398 | Inv. ex. |
| 60 | 441 | 553 | | | 304 | 361 | 290 | | | | | | 458 | 307 | Inv. ex. |
| 61 | 431 | 529 | | | 268 | 392 | 256 | | | | | | 454 | 289 | Inv. ex. |
| 62 | — | — | | | 249 | 394 | 216 | — | — | — | — | | 437 | 251 | Comp. ex. |
| 63 | 437 | 542 | | | 248 | 381 | 261 | 375 | 559 | | | 559 | 440 | 269 | Inv. ex. |
| 64 | 463 | 539 | | | 327 | 411 | 316 | | | | | | 481 | 344 | Inv. ex. |
| 65 | 446 | 533 | | | 296 | 425 | 301 | | | | | | 470 | 326 | Inv. ex. |
| 66 | 420 | 513 | 433 | 508 | — | — | 396 | — | — | — | — | | 454 | 302 | Comp. ex. |
| 67 | 427 | 523 | | | 280 | 419 | 339 | | | | | 523 | 455 | 320 | Inv. ex. |
| 68 | 494 | 540 | | | 345 | 367 | 366 | | | | | | 591 | 370 | Inv. ex. |
| 69 | 495 | 506 | | | 303 | 422 | 304 | | | | | | 592 | 371 | Inv. ex. |
| 70 | — | — | — | — | 301 | 385 | 332 | — | — | 304 | 396 | | 585 | 361 | Comp. ex. |

TABLE 13

| Experiment | Reheating process 1 | | Reheating process 2 | | Reheating process 3 | | Holding process | Reheating process 4 | | Reheating process 5 | | Alloying process | Bainite transformation | Martensite transformation | |
|---|---|---|---|---|---|---|---|---|---|---|---|---|---|---|---|
| | Cooling stop temp. °C. | Reheat stop temp. °C. | Cooling stop temp. °C. | Reheat stop temp. °C. | Cooling stop temp. °C. | Reheat stop temp. °C. | Holding time Sec. | Cooling stop temp. °C. | Reheat stop temp. °C. | Cooling stop temp. °C. | Reheat stop temp. °C. | Alloying temp. °C. | start temp. (Bs) °C. | start temp. (Ms) °C. | |
| 71 | 476 | 526 | | | 329 | 361 | 299 | 376 | 539 | | | 537 | 585 | 361 | Inv. ex. |
| 72 | 487 | 513 | | | 308 | 379 | 273 | | | | | | 585 | 415 | Inv. ex. |
| 73 | 485 | 510 | | | | | 247 | | | 306 | 373 | | 582 | 399 | Inv. ex. |
| 74 | 469 | 530 | | | 335 | 397 | 7 | | | | | | 568 | 395 | Comp. ex. |
| 75 | 460 | 504 | | | 296 | 414 | 228 | 417 | 528 | | | 528 | 568 | 389 | Inv. ex. |
| 76 | 486 | 515 | 473 | 523 | 215 | 414 | 238 | | | | | | 498 | 249 | Inv. ex. |
| 77 | 468 | 513 | | | | | 250 | | | 216 | 371 | | 501 | 224 | Inv. ex. |
| 78 | 472 | 554 | | | 250 | 367 | 3600 | | | | | | 528 | 269 | Comp. ex. |
| 79 | 487 | 545 | | | 232 | 395 | 269 | 396 | 521 | | | 521 | 526 | 257 | Inv. ex. |
| 80 | 482 | 537 | | | 342 | 397 | 453 | | | | | | 511 | 348 | Inv. ex. |
| 81 | 487 | 536 | | | 296 | 417 | 431 | | | | | | 496 | 330 | Inv. ex. |
| 82 | <u>444</u> | 534 | — | — | — | — | 488 | 440 | 515 | — | — | | 483 | 334 | Comp. ex. |
| 83 | 458 | 527 | | | 292 | 409 | 492 | | | | | | 515 | 353 | Inv. ex. |
| 84 | 453 | 542 | | | 189 | 425 | 288 | | | | | | 472 | 219 | Inv. ex. |
| 85 | 489 | 551 | 490 | 520 | | | 263 | 406 | 509 | 227 | 366 | | 504 | 266 | Inv. ex. |
| 86 | 481 | 513 | | | 232 | 414 | 252 | | | | | 513 | 480 | 268 | Inv. ex. |
| 87 | 454 | 535 | | | 257 | 400 | 244 | | | | | | 505 | 281 | Inv. ex. |
| 88 | 485 | 535 | | | 313 | 365 | 255 | | | | | | 548 | 385 | Inv. ex. |
| 89 | | | | | 330 | 411 | 210 | 414 | 506 | 318 | 378 | | 529 | 348 | Inv. ex. |
| 90 | 447 | 517 | | | 316 | 381 | 264 | | | | | 517 | 541 | 369 | Inv. ex. |
| 91 | 493 | 505 | 462 | 512 | 291 | 393 | 276 | | | 332 | 364 | | 547 | 380 | Inv. ex. |
| 92 | 484 | 529 | | | 219 | 400 | 147 | | | | | | 528 | 226 | Inv. ex. |
| 93 | | | | | 248 | 392 | 131 | | | | | | 514 | 285 | Inv. ex. |
| 94 | 497 | 534 | 459 | 519 | 279 | 384 | 128 | | | | | 519 | 544 | 289 | Inv. ex. |
| 95 | 458 | 535 | 469 | 504 | 239 | 402 | 125 | 382 | 513 | 258 | 357 | | 532 | 271 | Inv. ex. |
| 96 | 435 | 507 | | | 311 | 379 | 622 | | | | | | 444 | 322 | Inv. ex. |
| 97 | | | | | 304 | 376 | 456 | 419 | 509 | 330 | 368 | | 459 | 344 | Inv. ex. |
| 98 | 427 | 504 | | | 306 | 364 | 537 | | | | | | 451 | 337 | Inv. ex. |
| 99 | 415 | 522 | | | | | 526 | | | 312 | 379 | 522 | 438 | 321 | Inv. ex. |
| 100 | 472 | 527 | | | 289 | 365 | 61 | | | | | | 591 | 408 | Inv. ex. |
| 101 | 492 | 527 | 451 | 536 | 302 | 362 | 133 | | | | | | 550 | 330 | Inv. ex. |
| 102 | 459 | 504 | | | 323 | 359 | 534 | | | | | 504 | 551 | 354 | Inv. ex. |
| 103 | 461 | 524 | | | | | 246 | | | 285 | 353 | | 545 | 317 | Inv. ex. |
| 104 | 453 | 517 | | | 288 | 409 | 372 | | | | | | 521 | 373 | Inv. ex. |
| 105 | | | | | 336 | 397 | 353 | 453 | 530 | 340 | 373 | | 508 | 361 | Inv. ex. |

TABLE 14

| Experiment | Reheating process 1 | | Reheating process 2 | | Reheating process 3 | | Holding process | Reheating process 4 | | Reheating process 5 | | Alloying process | Bainite transformation | Martensite transformation | |
|---|---|---|---|---|---|---|---|---|---|---|---|---|---|---|---|
| | Cooling stop temp. °C. | Reheat stop temp. °C. | Cooling stop temp. °C. | Reheat stop temp. °C. | Cooling stop temp. °C. | Reheat stop temp. °C. | Holding time Sec. | Cooling stop temp. °C. | Reheat stop temp. °C. | Cooling stop temp. °C. | Reheat stop temp. °C. | Alloying temp. °C. | start temp. (Bs) °C. | start temp. (Ms) °C. | |
| 106 | 468 | 515 | | | 291 | 415 | 410 | | | | | | 521 | 371 | Inv. ex. |
| 107 | 495 | 552 | 465 | 502 | 309 | 381 | 232 | 441 | 539 | | | | 519 | 362 | Inv. ex. |
| 108 | 441 | 523 | | | 300 | 368 | 783 | | | | | | 469 | 335 | Inv. ex. |
| 109 | 422 | 519 | | | 309 | 419 | 625 | | | | | | 449 | 316 | Inv. ex. |
| 110 | 429 | 535 | | | 284 | 378 | 655 | | | | | 488 | 457 | 301 | Inv. ex. |
| 111 | 441 | 541 | 444 | 518 | | | 285 | | | 299 | 378 | | 466 | 305 | Inv. ex. |
| 112 | 373 | 542 | | | 200 | 355 | 272 | | | | | | 384 | 213 | Inv. ex. |
| 113 | 373 | 540 | | | 213 | 422 | 220 | | | | | | 387 | 245 | Inv. ex. |
| 114 | 409 | 550 | 396 | 515 | | | 270 | | | 240 | 369 | | 412 | 255 | Inv. ex. |
| 115 | 399 | 536 | | | 218 | 409 | 286 | | | | | | 410 | 252 | Comp. ex. |
| 116 | 471 | 506 | | | 302 | 409 | 232 | | | | | | — | — | Comp. ex. |
| 117 | <u>477</u> | 527 | | | <u>289</u> | 377 | 284 | | | | | | 595 | 401 | Comp. ex. |

TABLE 14-continued

| Experiment | Reheating process 1 | | Reheating process 2 | | Reheating process 3 | | Holding process | Reheating process 4 | | Reheating process 5 | | Alloying process | Bainite transformation | Martensite transformation | |
|---|---|---|---|---|---|---|---|---|---|---|---|---|---|---|---|
| | Cooling stop temp. °C. | Reheat stop temp. °C. | Cooling stop temp. °C. | Reheat stop temp. °C. | Cooling stop temp. °C. | Reheat stop temp. °C. | Holding time Sec. | Cooling stop temp. °C. | Reheat stop temp. °C. | Cooling stop temp. °C. | Reheat stop temp. °C. | Alloying temp. °C. | start temp. (Bs) °C. | start temp. (Ms) °C. | |
| 118 | 481 | 527 | | | 275 | 374 | 228 | | | | | | 648 | 304 | Comp. ex. |
| 119 | 438 | 540 | | | | | 275 | | | 319 | 375 | | 449 | 300 | Inv. ex. |
| 120 | 454 | 511 | | | 308 | 375 | 101 | | | | | | 468 | 338 | Inv. ex. |
| 121 | | | | | 344 | 379 | 106 | 365 | 503 | | | 500 | 485 | 366 | Inv. ex. |
| 122 | 464 | 526 | | | | | 77 | | | 275 | 382 | | 565 | 383 | Inv. ex. |
| 123 | | | | | 357 | 399 | 100 | 380 | 519 | | | 517 | 558 | 373 | Inv. ex. |
| 124 | 484 | 532 | | | 298 | 405 | 98 | | | | | | 575 | 387 | Inv. ex. |
| 125 | | | | | 343 | 370 | 87 | 361 | 509 | | | 503 | 574 | 385 | Inv. ex. |
| 126 | 473 | 536 | | | | | 73 | | | 241 | 357 | | 470 | 286 | Inv. ex. |
| 127 | | | | | 297 | 380 | 100 | 349 | 508 | | | 498 | 487 | 314 | Inv. ex. |

In the annealing process, first, the steel sheets were heated to the maximum heating temperatures described in Tables 7 to 10 by average heating rates between the (maximum heating temperature −20° C.) to maximum heating temperature of the average heating rates described in Tables 7 to 10. Next, in the first cooling process (primary cooling) from the maximum heating temperature to 700° C., they were cooled by the average cooling rates described in Tables 7 to 10. Furthermore, in the second cooling process (secondary cooling) from 700° C. to 500° C., they were cooled by the average cooling rates described in Tables 7 to 10.

After that, the steel sheets were reheated from the Bs point or 480° C. or less to 500° C. or more 1 to 3 times (reheating processes 1, 2, and 4) and, furthermore, were reheated from the Ms point or 350° C. or less to 350° C. or more 1 or 2 times (reheating processes 3 and 5).

After the reheating process 3, the steel sheets were held at 300 to 450° C. in range for exactly the times described in Tables 11 to 14 then were treated by the reheating processes 4 and 5 and cooled down to room temperature.

After being cooled down to room temperature, in Experiments 6 to 49, the steel sheets were cold rolled by 0.15%, in Experiments 60 to 83, the steel sheets were cold rolled by 0.30%, in Experiment 89, the steel sheet was cold rolled by 1.50%, in Experiment 93, the steel sheet was cold rolled by 1.00%, and in Experiments 96 to 118 and 120 to 127, the steel sheets were cold rolled by 0.25%.

The types of steels in the experiments are shown in the tables as cold rolled steel sheet (CR), hot rolled steel sheet (HR), electrolytically galvanized steel sheet (EG), hot dip galvanized steel sheet (GI), hot dip galvannealed steel sheet (GA), and hot rolled hot dip galvannealed steel sheet (HR-GA) (same in tables shown below).

Experiments 13, 23, 33, 91, 95, 107, and 114 are examples in which the steel sheets were electroplated after the annealing process to obtain galvanized steel sheets (EG).

Experiments 4, 18, 43, 83, and 87 are examples in which after the second cooling process, the steel sheets are dipped in a galvanization bath until the holding treatment at 350 to 450° C. in range to obtain hot dipped galvanized steel sheets (GI).

Experiments 48, 53, 58, 98, and 103 are examples in which after the holding treatment at 300 to 450° C. in range, the steel sheets are dipped in a galvanization bath, then are cooled to room temperature to obtain hot dipped galvanized steel sheets (GI).

Experiments 3, 5, 9, 34, 38, 44, 49, 67, 86, 90, 94, 99, 102, and 110 are examples in which after the second cooling process, the steel sheets are dipped in a galvanization bath until holding at 350 to 450° C. in range and then are treated for alloying at the described temperatures to obtain galvannealed steel sheets (GA).

Experiments 22, 24, 54, 59, 63, 71, 75, 79, 121, 123, 125, and 127 are examples in which after the holding treatment at 300 to 450° C. in range, the steel sheets are dipped in a galvanization bath and treated for alloying at the described temperatures to obtain hot dipped galvannealed steel sheets (GA).

Experiments 9, 63, and 90 are examples in which the surfaces of the plating layers are given films comprised of P-based composite oxides.

Tables 15 to 18 give the results of analysis of the microstructures of the steel sheets of Experiments 1 to 127. In the microstructure fractions, the amounts of residual austenite (residual γ) were measured by X-ray diffraction at planes parallel to the sheet thickness at ¼ thickness. The rest gives the results of measurement of the fractions of microstructures in the range of ⅛ thickness to ⅜ thickness. Sheet thickness cross-sections parallel to the rolling direction were cut out, polished to mirror surfaces, etched by Nital, then examined using field emission scanning electron microscope (FE-SEM).

TABLE 15

| Experiment | Chemical ingredients | Steel type | Microstructure observation results Volume fraction | | | | | | | |
|---|---|---|---|---|---|---|---|---|---|---|
| | | | F % | B % | BF % | TM % | M % | Residual γ % | Others % | |
| 1 | A | CR | 12 | 6 | 41 | 32 | 0 | 8 | 1 | Inv. ex. |
| 2 | A | CR | 55 | 5 | 17 | 18 | 1 | 4 | 0 | Inv. ex. |

TABLE 15-continued

| Experiment | Chemical ingredients | Steel type | F % | B % | BF % | TM % | M % | Residual γ % | Others % | |
|---|---|---|---|---|---|---|---|---|---|---|
| 3 | A | GA | 54 | 6 | 25 | 10 | 0 | 5 | 0 | Inv. ex. |
| 4 | A | GI | 54 | 18 | 9 | 15 | 1 | 3 | 0 | Inv. ex. |
| 5 | A | HR-GA | 57 | 3 | 20 | 13 | 0 | 6 | 1 | Inv. ex. |
| 6 | B | CR | 36 | 8 | 23 | 21 | 1 | 10 | 1 | Inv. ex. |
| 7 | B | CR | 39 | 5 | 17 | 28 | 0 | 11 | 0 | Inv. ex. |
| 8 | B | CR | 26 | 4 | 42 | 15 | 0 | 13 | 0 | Inv. ex. |
| 9 | B | GA | 41 | 5 | 31 | 8 | 0 | 15 | 0 | Inv. ex. |
| 10 | C | CR | 13 | 11 | 31 | 39 | 0 | 6 | 0 | Inv. ex. |
| 11 | C | CR | 13 | 2 | 42 | 36 | 0 | 7 | 0 | Inv. ex. |
| 12 | C | CR | 27 | 3 | 28 | 36 | 1 | 5 | 0 | Inv. ex. |
| 13 | C | EG | 14 | 5 | 28 | 48 | 0 | 5 | 0 | Inv. ex. |
| 14 | C | HR | 17 | 4 | 50 | 20 | 2 | 5 | 2 | Inv. ex. |
| 15 | D | CR | 32 | 1 | 21 | 30 | 0 | 15 | 1 | Inv. ex. |
| 16 | D | CR | 33 | 2 | 26 | 28 | 0 | 11 | 0 | Inv. ex. |
| 17 | D | CR | 32 | 6 | 18 | 29 | 1 | 13 | 1 | Inv. ex. |
| 18 | D | GI | 31 | 2 | 17 | 33 | 0 | 17 | 0 | Inv. ex. |
| 19 | D | HR | 32 | 7 | 20 | 22 | 0 | 19 | 0 | Inv. ex. |
| 20 | E | CR | 43 | 1 | 24 | 20 | 0 | 12 | 0 | Inv. ex. |
| 21 | E | CR | 38 | 4 | 20 | 30 | 0 | 8 | 0 | Inv. ex. |
| 22 | E | GA | 31 | 3 | 21 | 25 | 2 | 16 | 2 | Inv. ex. |
| 23 | E | EG | 39 | 1 | 19 | 29 | 0 | 12 | 0 | Inv. ex. |
| 24 | E | HR-GA | 42 | 9 | 22 | 15 | 1 | 11 | 0 | Inv. ex. |
| 25 | F | CR | 41 | 3 | 18 | 29 | 0 | 9 | 0 | Inv. ex. |
| 26 | F | CR | 15 | 0 | 29 | 46 | 0 | 9 | 1 | Inv. ex. |
| 27 | F | CR | 12 | 3 | 51 | 25 | 0 | 9 | 0 | Inv. ex. |
| 28 | F | CR | <u>0</u> | 23 | 35 | 35 | 0 | 6 | 1 | Comp. ex. |
| 29 | F | HR | 14 | 11 | 38 | 30 | 0 | 7 | 0 | Inv. ex. |
| 30 | G | CR | 56 | 3 | 18 | 9 | 0 | 14 | 0 | Inv. ex. |
| 31 | G | CR | 50 | 0 | 22 | 11 | 0 | 17 | 0 | Inv. ex. |
| 32 | G | CR | 66 | 0 | 0 | 0 | 0 | <u>0</u> | <u>34</u> | Comp. ex. |
| 33 | G | EG | 55 | 0 | 23 | 10 | 0 | 12 | 0 | Inv. ex. |
| 34 | G | HR-GA | 53 | 3 | 13 | 22 | 0 | 8 | 1 | Inv. ex. |
| 35 | H | CR | 37 | 7 | 17 | 26 | 0 | 13 | 0 | Inv. ex. |

TABLE 16

| Experiment | Chemical ingredients | Steel type | F % | B % | BF % | TM % | M % | Residual γ % | Others % | |
|---|---|---|---|---|---|---|---|---|---|---|
| 36 | H | CR | 21 | 7 | 31 | 29 | 0 | 11 | 1 | Inv. ex. |
| 37 | H | CR | <u>0</u> | 6 | 45 | 39 | 0 | 10 | 0 | Comp. ex. |
| 38 | H | GA | 58 | 2 | 12 | 15 | 0 | 13 | 0 | Inv. ex. |
| 39 | H | HR | 52 | 3 | 14 | 21 | 0 | 10 | 0 | Inv. ex. |
| 40 | I | CR | 50 | 4 | 18 | 23 | 0 | 5 | 0 | Inv. ex. |
| 41 | I | CR | 43 | 4 | 22 | 26 | 2 | 3 | 0 | Inv. ex. |
| 42 | I | CR | 67 | 18 | 2 | 5 | 0 | 0 | <u>8</u> | Comp. ex. |
| 43 | I | GI | 46 | 3 | 22 | 20 | 3 | 6 | 0 | Inv. ex. |
| 44 | I | HR-GA | 41 | 1 | 37 | 15 | 0 | 3 | 3 | Inv. ex. |
| 45 | J | CR | 38 | 7 | 14 | 28 | 0 | 13 | 0 | Inv. ex. |
| 46 | J | CR | 36 | 6 | 16 | 26 | 0 | 16 | 0 | Inv. ex. |
| 47 | J | CR | 73 | 13 | 2 | 5 | 0 | 1 | <u>6</u> | Comp. ex. |
| 48 | J | GI | 32 | 2 | 17 | 30 | 0 | 19 | 0 | Inv. ex. |
| 49 | J | HR-GA | 27 | 10 | 30 | 17 | 0 | 16 | 0 | Inv. ex. |
| 50 | K | CR | 28 | 2 | 41 | 14 | 0 | 15 | 0 | Inv. ex. |
| 51 | K | CR | 53 | 9 | 18 | 10 | 0 | 10 | 0 | Inv. ex. |
| 52 | K | CR | 35 | 0 | 33 | 17 | 3 | 12 | 0 | Comp. ex. |
| 53 | K | GI | 42 | 1 | 33 | 13 | 0 | 11 | 0 | Inv. ex. |
| 54 | K | HR-GA | 42 | 3 | 17 | 25 | 1 | 11 | 1 | Inv. ex. |
| 55 | L | CR | 40 | 13 | 37 | 5 | 0 | 5 | 0 | Inv. ex. |
| 56 | L | CR | 26 | 4 | 50 | 15 | 1 | 4 | 0 | Inv. ex. |
| 57 | L | CR | 39 | 11 | 36 | 7 | 1 | 6 | 0 | Comp. ex. |
| 58 | L | GI | 24 | 5 | 49 | 17 | 0 | 4 | 1 | Inv. ex. |
| 59 | L | HR-GA | 26 | 14 | 36 | 20 | 0 | 4 | 0 | Inv. ex. |
| 60 | M | CR | 32 | 5 | 36 | 18 | 0 | 9 | 0 | Inv. ex. |
| 61 | M | CR | 42 | 5 | 21 | 20 | 0 | 12 | 0 | Inv. ex. |
| 62 | M | CR | 49 | 4 | 24 | 7 | 2 | 14 | 0 | Comp. ex. |
| 63 | M | GA | 47 | 0 | 19 | 20 | 2 | 12 | 0 | Inv. ex. |
| 64 | N | CR | 0 | 1 | 55 | 35 | 0 | 9 | 0 | Inv. ex. |

TABLE 16-continued

| Experiment | Chemical ingredients | Steel type | F % | B % | BF % | TM % | M % | Residual γ % | Others % | |
|---|---|---|---|---|---|---|---|---|---|---|
| 65 | N | CR | 19 | 4 | 42 | 25 | 1 | 9 | 0 | Inv. ex. |
| 66 | N | CR | 39 | 1 | 23 | 22 | 1 | 14 | 0 | Comp. ex. |
| 67 | N | GA | 27 | 0 | 44 | 16 | 0 | 13 | 0 | Inv. ex. |
| 68 | O | CR | 36 | 1 | 20 | 34 | 2 | 7 | 0 | Inv. ex. |
| 69 | O | CR | 35 | 3 | 43 | 13 | 0 | 6 | 0 | Inv. ex. |
| 70 | O | CR | 41 | 5 | 33 | 13 | 2 | 6 | 0 | Comp. ex. |

TABLE 17

| Experiment | Chemical ingredients | Steel type | F % | B % | BF % | TM % | M % | Residual γ % | Others % | |
|---|---|---|---|---|---|---|---|---|---|---|
| 71 | O | GA | 41 | 3 | 33 | 15 | 0 | 8 | 0 | Inv. ex. |
| 72 | P | CR | 0 | 5 | 39 | 46 | 1 | 9 | 0 | Inv. ex. |
| 73 | P | CR | 18 | 3 | 42 | 28 | 1 | 8 | 0 | Inv. ex. |
| 74 | P | CR | 35 | 4 | 31 | 13 | <u>8</u> | 9 | 0 | Comp. ex. |
| 75 | P | GA | 34 | 2 | 32 | 28 | 0 | 4 | 0 | Inv. ex. |
| 76 | Q | CR | 50 | 5 | 20 | 11 | 0 | 13 | 1 | Inv. ex. |
| 77 | Q | CR | 54 | 1 | 15 | 20 | 0 | 10 | 0 | Inv. ex. |
| 78 | Q | CR | 51 | 1 | 11 | 28 | 0 | 9 | <u>0</u> | Comp. ex. |
| 79 | Q | GA | 46 | 0 | 16 | 23 | 0 | 15 | 0 | Inv. ex. |
| 80 | R | CR | 36 | 0 | 30 | 25 | 0 | 7 | 2 | Inv. ex. |
| 81 | R | CR | 53 | 7 | 15 | 19 | 0 | 6 | 0 | Inv. ex. |
| 82 | R | GA | 55 | 4 | 13 | 20 | 2 | 6 | 0 | Comp. ex. |
| 83 | R | GI | 41 | 0 | 18 | 29 | 3 | 6 | 3 | Inv. ex. |
| 84 | S | CR | 52 | 10 | 13 | 11 | 0 | 14 | 0 | Inv. ex. |
| 85 | S | CR | 43 | 8 | 13 | 24 | 0 | 12 | 0 | Inv. ex. |
| 86 | S | GA | 50 | 5 | 15 | 17 | 0 | 13 | 0 | Inv. ex. |
| 87 | S | GI | 45 | 1 | 20 | 16 | 2 | 15 | 1 | Inv. ex. |
| 88 | T | CR | 3 | 4 | 60 | 27 | 1 | 5 | 0 | Inv. ex. |
| 89 | T | CR | 37 | 0 | 22 | 33 | 1 | 7 | 0 | Inv. ex. |
| 90 | T | GA | 15 | 2 | 35 | 40 | 0 | 7 | 1 | Inv. ex. |
| 91 | T | EG | 12 | 1 | 57 | 21 | 0 | 8 | 1 | Inv. ex. |
| 92 | U | CR | 57 | 2 | 17 | 9 | 1 | 13 | 1 | Inv. ex. |
| 93 | U | CR | 52 | 6 | 23 | 9 | 0 | 10 | 0 | Inv. ex. |
| 94 | U | GA | 46 | 5 | 22 | 16 | 0 | 11 | 0 | Inv. ex. |
| 95 | U | EG | 53 | 0 | 21 | 17 | 0 | 9 | 0 | Inv. ex. |
| 96 | V | CR | 30 | 5 | 42 | 13 | 2 | 7 | 1 | Inv. ex. |
| 97 | V | CR | 14 | 5 | 36 | 36 | 1 | 7 | 1 | Inv. ex. |
| 98 | V | GI | 15 | 1 | 30 | 44 | 0 | 10 | 0 | Inv. ex. |
| 99 | V | GA | 32 | 4 | 28 | 30 | 0 | 6 | 0 | Inv. ex. |
| 100 | W | CR | 17 | 11 | 33 | 30 | 1 | 7 | 1 | Inv. ex. |
| 101 | W | CR | 68 | 1 | 9 | 18 | 0 | 4 | 0 | Inv. ex. |
| 102 | W | GA | 65 | 5 | 9 | 14 | 0 | 6 | 1 | Inv. ex. |
| 103 | W | GI | 65 | 1 | 22 | 9 | 0 | 3 | 0 | Inv. ex. |
| 104 | X | CR | 38 | 5 | 20 | 28 | 0 | 7 | 2 | Inv. ex. |
| 105 | X | CR | 47 | 1 | 27 | 21 | 0 | 4 | 0 | Inv. ex. |

TABLE 18

| Experiment | Chemical ingredients | Steel type | F % | B % | BF % | TM % | M % | Residual γ % | Others % | |
|---|---|---|---|---|---|---|---|---|---|---|
| 106 | X | CR | 38 | 5 | 35 | 15 | 1 | 6 | 0 | Inv. ex. |
| 107 | X | EG | 47 | 4 | 26 | 19 | 0 | 3 | 1 | Inv. ex. |
| 108 | Y | CR | 41 | 1 | 31 | 18 | 0 | 8 | 1 | Inv. ex. |
| 109 | Y | CR | 54 | 4 | 29 | 8 | 0 | 5 | 0 | Inv. ex. |
| 110 | Y | GA | 52 | 13 | 15 | 14 | 0 | 6 | 0 | Inv. ex. |
| 111 | Y | CR | 48 | 3 | 19 | 19 | 1 | 10 | 0 | Inv. ex. |
| 112 | Z | CR | 59 | 3 | 23 | 6 | 0 | 9 | 0 | Inv. ex. |
| 113 | Z | CR | 62 | 1 | 13 | 15 | 0 | 9 | 0 | Inv. ex. |
| 114 | Z | EG | 59 | 5 | 10 | 17 | 0 | 9 | 0 | Inv. ex. |
| 115 | Z | CR | 60 | 7 | 10 | 12 | 0 | 9 | 2 | Comp. ex. |

TABLE 18-continued

| Experiment | Chemical ingredients | Steel type | F % | B % | BF % | TM % | M % | Residual γ % | Others % | |
|---|---|---|---|---|---|---|---|---|---|---|
| 116 | AA | CR | 98 | 0 | 0 | 0 | 0 | 0 | 2 | Comp. ex. |
| 117 | AB | CR | 35 | 31 | 8 | 23 | 0 | 0 | 3 | Comp. ex. |
| 118 | AC | CR | 72 | 15 | 0 | 9 | 0 | 0 | 4 | Comp. ex. |
| 119 | B | HR | 31 | 5 | 34 | 13 | 0 | 17 | 0 | Inv. ex. |
| 120 | AD | CR | 48 | 7 | 24 | 15 | 0 | 6 | 0 | Inv. ex. |
| 121 | AD | GA | 22 | 21 | 37 | 16 | 0 | 4 | 0 | Inv. ex. |
| 122 | AE | CR | 4 | 31 | 33 | 19 | 1 | 11 | 1 | Inv. ex. |
| 123 | AE | GA | 16 | 28 | 38 | 10 | 0 | 8 | 0 | Inv. ex. |
| 124 | AF | CR | 7 | 0 | 31 | 45 | 2 | 13 | 2 | Inv. ex. |
| 125 | AF | GA | 9 | 7 | 43 | 28 | 0 | 12 | 1 | Inv. ex. |
| 126 | AG | CR | 36 | 6 | 23 | 21 | 0 | 14 | 0 | Inv. ex. |
| 127 | AG | GA | 22 | 31 | 22 | 14 | 2 | 9 | 0 | Inv. ex. |

Tables 19 to 22 show the results of measurement of the residual austenite fractions and the amounts of solid solution C in the residual austenite after deep cooling treatment tests. These were measured by X-ray diffraction at planes parallel to the sheet thickness at ¼ thickness. The $Ms_r$ points were measured by preparing liquid nitrogen (−198° C.) and ethanol cooled using liquid nitrogen in 20° C. increments from 0° C. to −100° C., holding the steel sheets at those temperatures for 1 hour, then measuring the residual austenite fractions and using the maximum temperatures at which the austenite fractions fall as the $Ms_r$ points of the residual austenite phase.

TABLE 19

| | | | Residual γ transformation temp. | | | | | |
|---|---|---|---|---|---|---|---|---|
| Experiment | Chemical ingredients | Steel type | $Ms_r$ point ° C. | Volume fraction after liquid nitrogen dipping 1st | 3rd | 5th | Solid solution C amount % | |
| 1 | A | CR | <−198 | G | G | G | 0.93 | Inv. ex. |
| 2 | A | CR | <−198 | G | G | G | 0.88 | Inv. ex. |
| 3 | A | GA | <−198 | G | G | G | 0.89 | Inv. ex. |
| 4 | A | GI | <−198 | G | G | G | 1.07 | Inv. ex. |
| 5 | A | HR-GA | <−198 | G | G | G | 0.89 | Inv. ex. |
| 6 | B | CR | <−198 | G | G | G | 0.95 | Inv. ex. |
| 7 | B | CR | <−198 | G | G | G | 1.02 | Inv. ex. |
| 8 | B | CR | <−198 | G | G | G | 1.07 | Inv. ex. |
| 9 | B | GA | <−198 | G | G | G | 0.96 | Inv. ex. |
| 10 | C | CR | <−198 | G | G | G | 0.96 | Inv. ex. |
| 11 | C | CR | <−198 | G | G | G | 0.90 | Inv. ex. |
| 12 | C | CR | −100 to −80 | P | | | 1.01 | Inv. ex. |
| 13 | C | EG | <−198 | G | G | G | 1.01 | Inv. ex. |
| 14 | C | HR | <−198 | G | G | G | 0.99 | Inv. ex. |
| 15 | D | CR | <−198 | G | G | G | 0.98 | Inv. ex. |
| 16 | D | CR | <−198 | G | G | G | 1.03 | Inv. ex. |
| 17 | D | CR | −100 to −80 | P | | | 0.92 | Inv. ex. |
| 18 | D | GI | <−198 | G | G | G | 0.88 | Inv. ex. |
| 19 | D | HR | <−198 | G | G | G | 0.95 | Inv. ex. |
| 20 | E | CR | <−198 | G | G | G | 0.94 | Inv. ex. |
| 21 | E | CR | <−198 | G | G | G | 1.05 | Inv. ex. |
| 22 | E | GA | <−198 | G | G | G | 1.04 | Inv. ex. |
| 23 | E | EG | <−198 | G | G | G | 0.88 | Inv. ex. |
| 24 | E | HR-GA | <−198 | G | G | G | 0.96 | Inv. ex. |
| 25 | F | CR | <−198 | G | G | G | 1.01 | Inv. ex. |
| 26 | F | CR | <−198 | G | G | G | 1.02 | Inv. ex. |
| 27 | F | CR | <−198 | G | G | G | 1.05 | Inv. ex. |
| 28 | F | CR | <−198 | G | G | G | 0.97 | Comp. ex. |
| 29 | F | HR | <−198 | G | G | G | 0.93 | Inv. ex. |
| 30 | G | CR | <−198 | G | G | G | 0.98 | Inv. ex. |
| 31 | G | CR | <−198 | G | G | G | 1.07 | Inv. ex. |
| 32 | G | CR | No residual austenite | | | | | Comp. ex. |
| 33 | G | EG | <−198 | G | G | G | 1.04 | Inv. ex. |
| 34 | G | HR-GA | <−198 | G | G | G | 1.06 | Inv. ex. |
| 35 | H | CR | <−198 | G | G | G | 0.99 | Inv. ex. |

TABLE 20

| Experiment | Chemical ingredients | Steel type | Residual γ transformation temp. Ms$_r$ point ° C. | Volume fraction after liquid nitrogen dipping 1st | 3rd | 5th | Solid solution C amount % | |
|---|---|---|---|---|---|---|---|---|
| 36 | H | CR | <−198 | G | G | G | 0.99 | Inv. ex. |
| 37 | H | CR | <−198 | G | G | G | 1.06 | Comp. ex. |
| 38 | H | GA | <−198 | G | G | G | 0.92 | Inv. ex. |
| 39 | H | HR | <−198 | G | G | G | 0.97 | Inv. ex. |
| 40 | I | CR | <−198 | G | G | G | 0.91 | Inv. ex. |
| 41 | I | CR | <−198 | G | G | G | 0.90 | Inv. ex. |
| 42 | I | CR | No residual austenite | | | | | Comp. ex. |
| 43 | I | GI | <−198 | G | G | G | 1.03 | Inv. ex. |
| 44 | I | HR-GA | <−198 | G | G | G | 1.02 | Inv. ex. |
| 45 | J | CR | <−198 | G | G | G | 0.94 | Inv. ex. |
| 46 | J | CR | <−198 | G | G | G | 1.00 | Inv. ex. |
| 47 | J | CR | >0 | P | | | 0.98 | Comp. ex. |
| 48 | J | GI | <−198 | G | G | G | 0.95 | Inv. ex. |
| 49 | J | HR-GA | <−198 | G | G | G | 1.03 | Inv. ex. |
| 50 | K | CR | <−198 | G | G | G | 1.06 | Inv. ex. |
| 51 | K | CR | <−198 | G | G | G | 0.93 | Inv. ex. |
| 52 | K | CR | −40 to −20 | P | | | 0.99 | Comp. ex. |
| 53 | K | GI | <−198 | G | G | G | 0.88 | Inv. ex. |
| 54 | K | HR-GA | <−198 | G | G | G | 1.03 | Inv. ex. |
| 55 | L | CR | <−198 | G | G | G | 1.06 | Inv. ex. |
| 56 | L | CR | <−198 | G | G | G | 0.95 | Inv. ex. |
| 57 | L | CR | −60 to −40 | P | | | 0.98 | Comp. ex. |
| 58 | L | GI | <−198 | G | G | G | 0.97 | Inv. ex. |
| 59 | L | HR-GA | <−198 | G | G | G | 0.92 | Inv. ex. |
| 60 | M | CR | <−198 | G | G | G | 1.01 | Inv. ex. |
| 61 | M | CR | <−198 | G | G | G | 1.00 | Inv. ex. |
| 62 | M | CR | −40 to −20 | P | | | 0.93 | Comp. ex. |
| 63 | M | GA | <−198 | G | G | G | 1.02 | Inv. ex. |
| 64 | N | CR | <−198 | G | G | G | 0.96 | Inv. ex. |
| 65 | N | CR | <−198 | G | G | G | 0.91 | Inv. ex. |
| 66 | N | CR | −40 to −20 | P | | | 0.92 | Comp. ex. |
| 67 | N | GA | <−198 | G | G | G | 0.94 | Inv. ex. |
| 68 | O | CR | <−198 | G | G | G | 0.99 | Inv. ex. |
| 69 | O | CR | <−198 | G | G | G | 0.95 | Inv. ex. |
| 70 | O | CR | −60 to −40 | P | | | 0.94 | Comp. ex. |

TABLE 21

| Experiment | Chemical ingredients | Steel type | Residual γ transformation temp. Ms$_r$ point ° C. | Volume fraction after liquid nitrogen dipping 1st | 3rd | 5th | Solid solution C amount % | |
|---|---|---|---|---|---|---|---|---|
| 71 | O | GA | <−198 | G | G | G | 0.90 | Inv. ex. |
| 72 | P | CR | <−198 | G | G | G | 0.93 | Inv. ex. |
| 73 | P | CR | <−198 | G | G | G | 1.06 | Inv. ex. |
| 74 | P | CR | −20 to 0 | P | | | 0.74 | Comp. ex. |
| 75 | P | GA | <−198 | G | G | G | 1.02 | Inv. ex. |
| 76 | Q | CR | <−198 | G | G | G | 1.04 | Inv. ex. |
| 77 | Q | CR | <−198 | G | G | G | 1.02 | Inv. ex. |
| 78 | Q | CR | −40 to −20 | P | | | 0.78 | Comp. ex. |
| 79 | Q | GA | <−198 | G | G | G | 0.91 | Inv. ex. |
| 80 | R | CR | <−198 | G | G | G | 1.05 | Inv. ex. |
| 81 | R | CR | <−198 | G | G | G | 0.97 | Inv. ex. |
| 82 | R | GA | −40 to −20 | P | | | 0.94 | Comp. ex. |
| 83 | R | GI | <−198 | G | G | G | 1.01 | Inv. ex. |
| 84 | S | CR | <−198 | G | G | G | 0.90 | Inv. ex. |
| 85 | S | CR | <−198 | G | G | G | 1.02 | Inv. ex. |
| 86 | S | GA | <−198 | G | G | G | 0.99 | Inv. ex. |
| 87 | S | GI | <−198 | G | G | G | 1.05 | Inv. ex. |
| 88 | T | CR | <−198 | G | G | G | 1.03 | Inv. ex. |
| 89 | T | CR | <−198 | G | G | G | 1.03 | Inv. ex. |

TABLE 21-continued

| | | | | Residual γ transformation temp. | | | | |
|---|---|---|---|---|---|---|---|---|
| Experiment | Chemical ingredients | Steel type | Ms$_r$ point °C. | Volume fraction after liquid nitrogen dipping 1st | 3rd | 5th | Solid solution C amount % | |
| 90 | T | GA | <−198 | G | G | G | 1.03 | Inv. ex. |
| 91 | T | EG | <−198 | G | G | G | 1.03 | Inv. ex. |
| 92 | U | CR | <−198 | G | G | G | 0.89 | Inv. ex. |
| 93 | U | CR | <−198 | G | G | G | 1.02 | Inv. ex. |
| 94 | U | GA | <−198 | G | G | G | 0.99 | Inv. ex. |
| 95 | U | EG | <−198 | G | G | G | 0.92 | Inv. ex. |
| 96 | V | CR | <−198 | G | G | G | 0.95 | Inv. ex. |
| 97 | V | CR | <−198 | G | G | G | 0.94 | Inv. ex. |
| 98 | V | GI | <−198 | G | G | G | 1.05 | Inv. ex. |
| 99 | V | GA | <−198 | G | G | G | 0.95 | Inv. ex. |
| 100 | W | CR | <−198 | G | G | G | 0.89 | Inv. ex. |
| 101 | W | CR | <−198 | G | G | G | 0.93 | Inv. ex. |
| 102 | W | GA | <−198 | G | G | G | 1.07 | Inv. ex. |
| 103 | W | GI | <−198 | G | G | G | 0.92 | Inv. ex. |
| 104 | X | CR | <−198 | G | G | G | 1.05 | Inv. ex. |
| 105 | X | CR | <−198 | G | G | G | 1.00 | Inv. ex. |

TABLE 22

| | | | | Residual γ transformation temp. | | | | |
|---|---|---|---|---|---|---|---|---|
| Experiment | Chemical ingredients | Steel type | Ms$_r$ point °C. | Volume fraction after liquid nitrogen dipping 1st | 3rd | 5th | Solid solution C amount % | |
| 106 | X | CR | <−198 | G | P | | 0.89 | Inv. ex. |
| 107 | X | EG | <−198 | G | G | G | 1.07 | Inv. ex. |
| 108 | Y | CR | <−198 | G | G | G | 0.96 | Inv. ex. |
| 109 | Y | CR | <−198 | G | G | G | 0.93 | Inv. ex. |
| 110 | Y | GA | <−198 | G | G | G | 0.99 | Inv. ex. |
| 111 | Y | CR | <−198 | G | G | G | 1.04 | Inv. ex. |
| 112 | Z | CR | <−198 | G | G | G | 1.01 | Inv. ex. |
| 113 | Z | CR | <−198 | G | G | G | 0.91 | Inv. ex. |
| 114 | Z | EG | <−198 | G | G | G | 1.05 | Inv. ex. |
| 115 | Z | CR | <−198 | G | G | G | 0.95 | Comp. ex. |
| 116 | AA | CR | | No residual austenite | | | | Comp. ex. |
| 117 | AB | CR | | No residual austenite | | | | Comp. ex. |
| 118 | AC | CR | | No residual austenite | | | | Comp. ex. |
| 119 | B | HR | <−198 | G | G | G | 0.90 | Inv. ex. |
| 120 | AD | CR | <−198 | G | G | G | 0.99 | Inv. ex. |
| 121 | AD | GA | <−198 | G | G | G | 0.89 | Inv. ex. |
| 122 | AE | CR | <−198 | G | G | G | 0.99 | Inv. ex. |
| 123 | AE | GA | <−198 | G | G | G | 0.86 | Inv. ex. |
| 124 | AF | CR | <−198 | G | G | G | 0.93 | Inv. ex. |
| 125 | AF | GA | <−198 | G | G | G | 0.90 | Inv. ex. |
| 126 | AG | CR | <−198 | G | G | G | 0.89 | Inv. ex. |
| 127 | AG | GA | <−198 | G | G | G | 0.87 | Inv. ex. |

In the dipping treatment in liquid nitrogen, the operation from dipping the steel sheet in liquid nitrogen for 1 hour, then taking it out and allowing it to stand in the air until reaching room temperature is counted as one treatment. The residual austenite fractions were measured at the points of time of the ends of the first, third, and 10th treatments. Steel sheets with residual austenite fractions which did not change were evaluated as "G (good)" while steel sheets with residual austenite fractions which decreased were evaluated as "P (poor)".

Tables 23 to 26 show the evaluation of properties of the steel sheets of Experiments 1 to 127. At that time, tensile test pieces based on JIS Z 2201 were taken from the steel sheets of Experiments 1 to 127 and were subjected to tensile tests based on JIS Z 2241 to measure the yield strength (YS), tensile strength (TS), and total elongation (EL).

Figure 2:
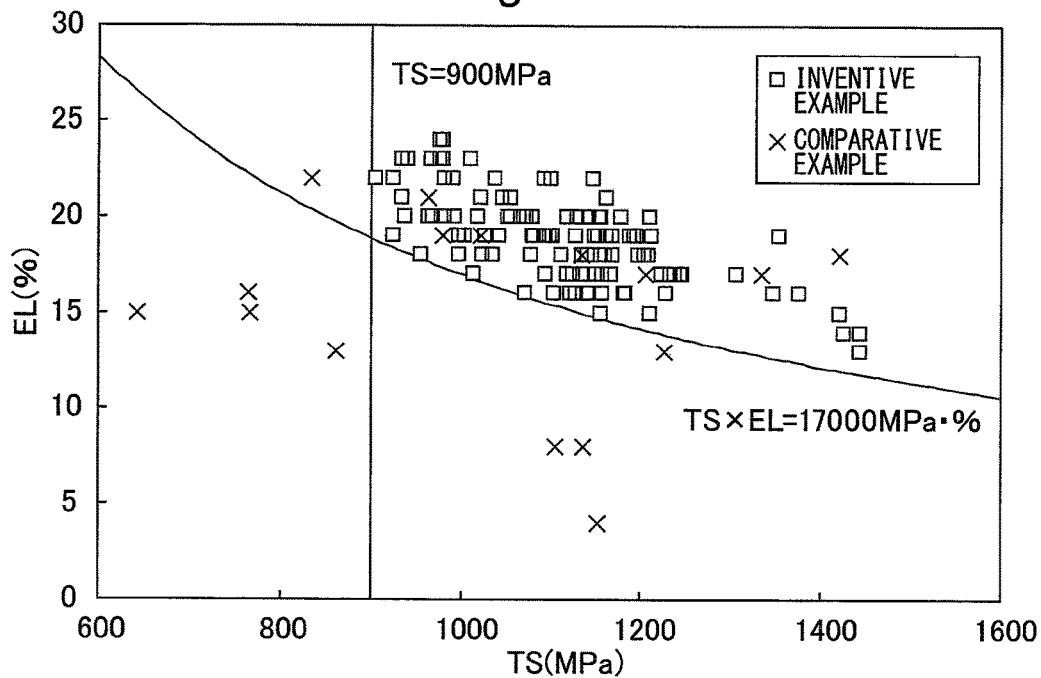
FIG. 2 is a view which explains an embodiment of the present invention and a view which shows the relationship between a tensile strength TS and a total elongation EL.
Figure 3:
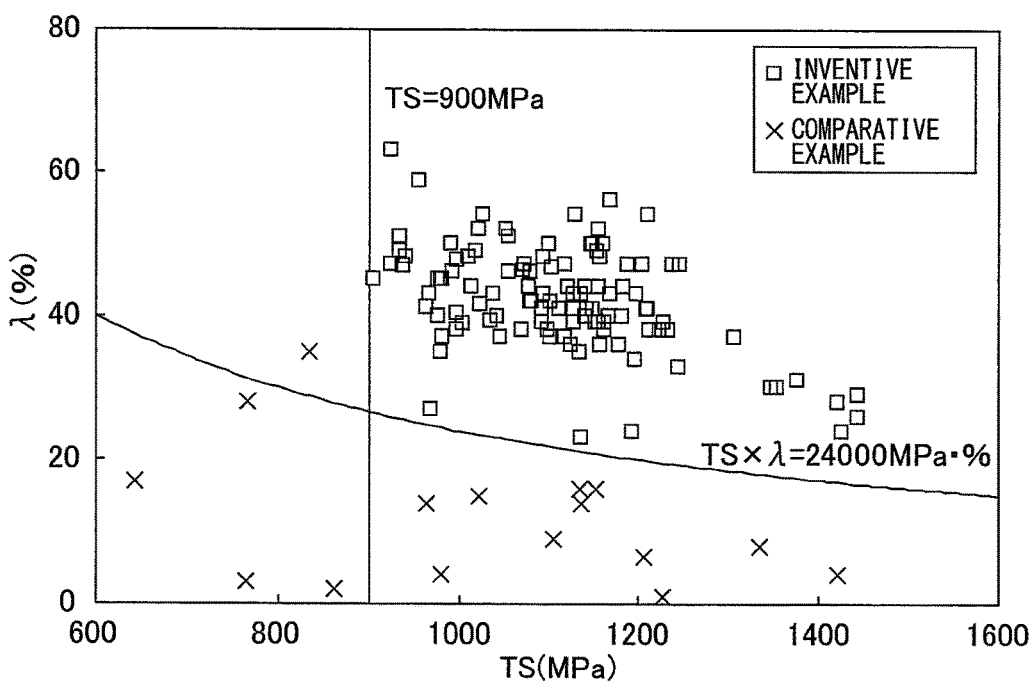
FIG. 3 is a view which explains an embodiment of the present invention and a graph which shows the relationship between a tensile strength TS and a hole expansion rate λ.

FIG. 2 shows the relationship between the tensile strength (TS) and the total elongation (EL), while FIG. 3 shows the relationship between the tensile strength (TS) and the hole expansion rate (λ) which serves as an indicator of the stretch flangeability. The steel sheets of the present invention satisfy all of TS≥900 MPa, TS×EL≥17000 MPa·%, TS×λ≥24000 MPa·%. The steel sheets of the comparative examples are not steel sheets which satisfy all of these.

TABLE 23

| Experiment | Chemical ingredients | Steel type | Material measurement results | | | | TS × EL MPa · % | TS × λ MPa · % | |
|---|---|---|---|---|---|---|---|---|---|
| | | | YS MPa | TS MPa | EL % | λ % | | | |
| 1 | A | CR | 943 | 1026 | 19 | 54 | 19494 | 55404 | Inv. ex. |
| 2 | A | CR | 503 | 1004 | 19 | 39 | 19076 | 39086 | Inv. ex. |
| 3 | A | GA | 474 | 982 | 20 | 37 | 19640 | 36315 | Inv. ex. |
| 4 | A | GI | 492 | 998 | 19 | 40 | 18962 | 40202 | Inv. ex. |
| 5 | A | HR-GA | 493 | 941 | 23 | 48 | 21643 | 45168 | Inv. ex. |
| 6 | B | CR | 777 | 1102 | 19 | 42 | 20938 | 46284 | Inv. ex. |
| 7 | B | CR | 729 | 1143 | 20 | 41 | 22860 | 46863 | Inv. ex. |
| 8 | B | CR | 872 | 1426 | 14 | 24 | 19964 | 34224 | Inv. ex. |
| 9 | B | GA | 674 | 1163 | 21 | 39 | 24423 | 45357 | Inv. ex. |
| 10 | C | CR | 835 | 980 | 23 | 45 | 22540 | 44100 | Inv. ex. |
| 11 | C | CR | 846 | 992 | 20 | 46 | 19840 | 45632 | Inv. ex. |
| 12 | C | CR | 778 | 969 | 20 | 27 | 19380 | 26163 | Inv. ex. |
| 13 | C | EG | 959 | 1074 | 20 | 47 | 21480 | 50478 | Inv. ex. |
| 14 | C | HR | 707 | 937 | 20 | 47 | 18740 | 43955 | Inv. ex. |
| 15 | D | CR | 906 | 1213 | 19 | 38 | 23047 | 46094 | Inv. ex. |
| 16 | D | CR | 873 | 1205 | 18 | 47 | 21690 | 56635 | Inv. ex. |
| 17 | D | CR | 830 | 1193 | 19 | 24 | 22667 | 28632 | Inv. ex. |
| 18 | D | GI | 1000 | 1306 | 17 | 37 | 22202 | 48322 | Inv. ex. |
| 19 | D | HR | 752 | 1179 | 20 | 36 | 23580 | 42444 | Inv. ex. |
| 20 | E | CR | 611 | 1094 | 17 | 43 | 18598 | 47042 | Inv. ex. |
| 21 | E | CR | 694 | 1168 | 19 | 43 | 22192 | 50224 | Inv. ex. |
| 22 | E | GA | 836 | 1093 | 19 | 39 | 20767 | 42627 | Inv. ex. |
| 23 | E | EG | 723 | 1122 | 16 | 44 | 17952 | 49368 | Inv. ex. |
| 24 | E | HR-GA | 657 | 1055 | 20 | 51 | 21100 | 53805 | Inv. ex. |
| 25 | F | CR | 578 | 1010 | 23 | 48 | 23230 | 48480 | Inv. ex. |
| 26 | F | CR | 762 | 1021 | 21 | 52 | 21441 | 53092 | Inv. ex. |
| 27 | F | CR | 945 | 1129 | 19 | 41 | 21451 | 46289 | Inv. ex. |
| 28 | F | CR | 1061 | 1137 | 8 | 14 | 9096 | 15918 | Comp. ex. |
| 29 | F | HR | 829 | 1078 | 18 | 44 | 19404 | 47432 | Inv. ex. |
| 30 | G | CR | 505 | 1093 | 22 | 41 | 24046 | 44813 | Inv. ex. |
| 31 | G | CR | 699 | 1160 | 18 | 50 | 20880 | 58000 | Inv. ex. |
| 32 | G | CR | 483 | 642 | 15 | 17 | 9630 | 10914 | Comp. ex. |
| 33 | G | EG | 581 | 1147 | 22 | 50 | 25234 | 57350 | Inv. ex. |
| 34 | G | HR-GA | 619 | 1158 | 17 | 48 | 19686 | 55584 | Inv. ex. |
| 35 | H | CR | 665 | 1071 | 16 | 46 | 17136 | 49596 | Inv. ex. |

TABLE 24

| Experiment | Chemical ingredients | Steel type | Material measurement results | | | | TS × EL MPa · % | TS × λ MPa · % | |
|---|---|---|---|---|---|---|---|---|---|
| | | | YS MPa | TS MPa | EL % | λ % | | | |
| 36 | H | CR | 942 | 1155 | 18 | 52 | 20790 | 60060 | Inv. ex. |
| 37 | H | CR | 1017 | 1106 | 8 | 9 | 8848 | 9954 | Comp. ex. |
| 38 | H | GA | 477 | 1103 | 19 | 37 | 20957 | 40811 | Inv. ex. |
| 39 | H | HR | 590 | 1095 | 19 | 48 | 20805 | 52560 | Inv. ex. |
| 40 | I | CR | 546 | 935 | 23 | 49 | 21505 | 45815 | Inv. ex. |
| 41 | I | CR | 513 | 925 | 19 | 63 | 17575 | 58275 | Inv. ex. |
| 42 | I | CR | 460 | 861 | 13 | 2 | 11193 | 1722 | Comp. ex. |
| 43 | I | GI | 564 | 998 | 18 | 48 | 17964 | 47520 | Inv. ex. |
| 44 | I | HR-GA | 630 | 955 | 18 | 59 | 17190 | 56015 | Inv. ex. |
| 45 | J | CR | 680 | 1038 | 22 | 43 | 22836 | 44634 | Inv. ex. |
| 46 | J | CR | 606 | 991 | 22 | 50 | 21802 | 49550 | Inv. ex. |
| 47 | J | CR | 511 | 765 | 16 | 3 | 12240 | 2295 | Comp. ex. |
| 48 | J | GI | 652 | 977 | 24 | 45 | 23448 | 43965 | Inv. ex. |
| 49 | J | HR-GA | 743 | 1046 | 21 | 37 | 21966 | 38702 | Inv. ex. |
| 50 | K | CR | 820 | 1154 | 20 | 49 | 23080 | 56546 | Inv. ex. |
| 51 | K | CR | 584 | 1118 | 20 | 47 | 22360 | 52546 | Inv. ex. |
| 52 | K | CR | 895 | 1227 | 13 | 1 | 15951 | 1227 | Comp. ex. |
| 53 | K | GI | 720 | 1142 | 18 | 44 | 20556 | 50248 | Inv. ex. |
| 54 | K | HR-GA | 766 | 1141 | 16 | 40 | 18256 | 45640 | Inv. ex. |
| 55 | L | CR | 615 | 998 | 19 | 38 | 18962 | 37924 | Inv. ex. |
| 56 | L | CR | 687 | 925 | 22 | 47 | 20350 | 43475 | Inv. ex. |
| 57 | L | CR | 656 | 964 | 21 | 14 | 20244 | 13496 | Comp. ex. |
| 58 | L | GI | 736 | 1024 | 18 | 42 | 18432 | 42634 | Inv. ex. |
| 59 | L | HR-GA | 732 | 998 | 18 | 48 | 17964 | 47520 | Inv. ex. |
| 60 | M | CR | 1013 | 1346 | 16 | 30 | 21536 | 40380 | Inv. ex. |
| 61 | M | CR | 1076 | 1421 | 15 | 28 | 21315 | 39788 | Inv. ex. |
| 62 | M | CR | 826 | 1420 | 18 | 4 | 25560 | 5680 | Comp. ex. |

TABLE 24-continued

| Experiment | Chemical ingredients | Steel type | Material measurement results YS MPa | TS MPa | EL % | λ % | TS × EL MPa · % | TS × λ MPa · % | |
|---|---|---|---|---|---|---|---|---|---|
| 63 | M | GA | 915 | 1443 | 13 | 26 | 18759 | 37518 | Inv. ex. |
| 64 | N | CR | 1249 | 1443 | 14 | 29 | 20202 | 41847 | Inv. ex. |
| 65 | N | CR | 962 | 1375 | 16 | 31 | 22000 | 42625 | Inv. ex. |
| 66 | N | CR | 806 | 1333 | 17 | 8 | 22661 | 10664 | Comp. ex. |
| 67 | N | GA | 932 | 1353 | 19 | 30 | 25707 | 40590 | Inv. ex. |
| 68 | O | CR | 681 | 1019 | 20 | 49 | 20380 | 49931 | Inv. ex. |
| 69 | O | CR | 655 | 980 | 24 | 35 | 23520 | 34300 | Inv. ex. |
| 70 | O | CR | 615 | 1021 | 19 | 15 | 19399 | 15315 | Comp. ex. |

TABLE 25

| Experiment | Chemical ingredients | Steel type | Material measurement results YS MPa | TS MPa | EL % | λ % | TS × EL MPa · % | TS × λ MPa · % | |
|---|---|---|---|---|---|---|---|---|---|
| 71 | O | GA | 659 | 1081 | 19 | 42 | 20539 | 45402 | Inv. ex. |
| 72 | P | CR | 1002 | 1099 | 19 | 38 | 20881 | 41762 | Inv. ex. |
| 73 | P | CR | 791 | 1034 | 18 | 39 | 18612 | 40672 | Inv. ex. |
| 74 | P | CR | 707 | 980 | 19 | 4 | 18620 | 3920 | Comp. ex. |
| 75 | P | GA | 666 | 963 | 20 | 41 | 19260 | 39650 | Inv. ex. |
| 76 | Q | CR | 642 | 1118 | 17 | 37 | 19006 | 41366 | Inv. ex. |
| 77 | Q | CR | 569 | 1182 | 16 | 40 | 18912 | 47280 | Inv. ex. |
| 78 | Q | CR | 598 | 1206 | 17 | 7 | 20502 | 8005 | Comp. ex. |
| 79 | Q | GA | 601 | 1101 | 22 | 50 | 24222 | 55050 | Inv. ex. |
| 80 | R | CR | 709 | 1162 | 19 | 38 | 22078 | 44156 | Inv. ex. |
| 81 | R | CR | 525 | 1070 | 20 | 38 | 21400 | 40660 | Inv. ex. |
| 82 | R | GA | 582 | 1134 | 18 | 16 | 20412 | 18144 | Comp. ex. |
| 83 | R | GI | 732 | 1128 | 16 | 43 | 18048 | 48504 | Inv. ex. |
| 84 | S | CR | 607 | 1228 | 16 | 39 | 19648 | 47892 | Inv. ex. |
| 85 | S | CR | 724 | 1209 | 18 | 41 | 21762 | 49569 | Inv. ex. |
| 86 | S | GA | 622 | 1211 | 20 | 54 | 24220 | 65394 | Inv. ex. |
| 87 | S | GI | 740 | 1238 | 17 | 47 | 21046 | 58186 | Inv. ex. |
| 88 | T | CR | 1107 | 1157 | 16 | 36 | 18512 | 41652 | Inv. ex. |
| 89 | T | CR | 871 | 1224 | 17 | 38 | 20808 | 46512 | Inv. ex. |
| 90 | T | GA | 916 | 1149 | 19 | 41 | 21831 | 47109 | Inv. ex. |
| 91 | T | EG | 1089 | 1184 | 16 | 44 | 18944 | 52096 | Inv. ex. |
| 92 | U | CR | 529 | 1130 | 20 | 54 | 22600 | 61020 | Inv. ex. |
| 93 | U | CR | 597 | 1137 | 17 | 43 | 19329 | 48891 | Inv. ex. |
| 94 | U | GA | 622 | 1052 | 20 | 52 | 21040 | 54704 | Inv. ex. |
| 95 | U | EG | 559 | 1042 | 19 | 40 | 19798 | 41680 | Inv. ex. |
| 96 | V | CR | 934 | 1210 | 15 | 41 | 18150 | 49610 | Inv. ex. |
| 97 | V | CR | 1055 | 1247 | 17 | 47 | 21199 | 58609 | Inv. ex. |
| 98 | V | GI | 900 | 1150 | 17 | 50 | 19550 | 57500 | Inv. ex. |
| 99 | V | GA | 795 | 1155 | 15 | 44 | 17325 | 50820 | Inv. ex. |
| 100 | W | CR | 878 | 982 | 22 | 45 | 21604 | 44190 | Inv. ex. |
| 101 | W | CR | 366 | 977 | 23 | 40 | 22471 | 39080 | Inv. ex. |
| 102 | W | GA | 375 | 934 | 21 | 51 | 19614 | 47634 | Inv. ex. |
| 103 | W | GI | 391 | 1013 | 17 | 44 | 17221 | 44572 | Inv. ex. |
| 104 | X | CR | 764 | 1104 | 16 | 47 | 17664 | 51610 | Inv. ex. |
| 105 | X | CR | 626 | 1112 | 18 | 41 | 20016 | 45592 | Inv. ex. |

TABLE 26

| Experiment | Chemical ingredients | Steel type | Material measurement results YS MPa | TS MPa | EL % | λ % | TS × EL MPa · % | TS × λ MPa · % | |
|---|---|---|---|---|---|---|---|---|---|
| 106 | X | CR | 707 | 1136 | 17 | 23 | 19312 | 26201 | Inv. ex. |
| 107 | X | EG | 663 | 1079 | 20 | 46 | 21580 | 49634 | Inv. ex. |
| 108 | Y | CR | 742 | 1080 | 19 | 42 | 20520 | 45360 | Inv. ex. |
| 109 | Y | CR | 619 | 1128 | 19 | 39 | 21432 | 43992 | Inv. ex. |
| 110 | Y | GA | 543 | 1125 | 17 | 36 | 19125 | 40500 | Inv. ex. |
| 111 | Y | CR | 673 | 1188 | 19 | 47 | 22572 | 55836 | Inv. ex. |
| 112 | Z | CR | 606 | 1198 | 18 | 43 | 21564 | 51514 | Inv. ex. |
| 113 | Z | CR | 572 | 1245 | 17 | 33 | 21165 | 41085 | Inv. ex. |

TABLE 26-continued

| Experiment | Chemical ingredients | Steel type | Material measurement results | | | | TS × EL | TS × λ | |
|---|---|---|---|---|---|---|---|---|---|
| | | | YS MPa | TS MPa | EL % | λ % | MPa · % | MPa · % | |
| 114 | Z | EG | 583 | 1196 | 19 | 34 | 22724 | 40664 | Inv. ex. |
| 115 | Z | CR | 554 | 1152 | 4 | 16 | 4608 | 18432 | Comp. ex. |
| 116 | AA | CR | 323 | 424 | 38 | 107 | 16112 | 45368 | Comp. ex. |
| 117 | AB | CR | 683 | 766 | 15 | 28 | 11490 | 21448 | Comp. ex. |
| 118 | AC | CR | 398 | 834 | 22 | 35 | 18348 | 29190 | Comp. ex. |
| 119 | B | HR | 833 | 1167 | 17 | 40 | 19839 | 46680 | Inv. ex. |
| 120 | AD | CR | 641 | 906 | 22 | 45 | 19932 | 40770 | Inv. ex. |
| 121 | AD | GA | 734 | 966 | 23 | 43 | 22218 | 41538 | Inv. ex. |
| 122 | AE | CR | 953 | 1156 | 20 | 39 | 23120 | 45084 | Inv. ex. |
| 123 | AE | GA | 890 | 1135 | 18 | 35 | 20430 | 39725 | Inv. ex. |
| 124 | AF | CR | 891 | 1169 | 18 | 56 | 21042 | 65464 | Inv. ex. |
| 125 | AF | GA | 879 | 1234 | 17 | 38 | 20978 | 46892 | Inv. ex. |
| 126 | AG | CR | 635 | 1152 | 19 | 39 | 21888 | 44928 | Inv. ex. |
| 127 | AG | GA | 701 | 1055 | 21 | 46 | 22155 | 48530 | Inv. ex. |

Experiment 115 is an example in which the end temperature of the hot rolling is low. The microstructure is stretched in one direction making it uneven, so the ductility and stretch flangeability are poor.

Experiments 12, 17, 106, and 111 are examples in which the heating rate from the (maximum heating temperature −20° C.) in the heating process is large. The residual austenite phase is unstable and the stretch flangeability is poor.

Experiment 28 is an example in which the maximum heating temperature in the annealing process is high. The soft structure is not sufficiently formed and the ductility is poor.

Experiment 32 is an example in which the maximum heating temperature in the annealing process is low. A large number of coarse iron-based carbides which form starting points of fracture are included, so the ductility and stretch flangeability are poor.

Experiment 37 is an example in which the average cooling rate in the first cooling process (primary cooling) is high. Soft structures are not sufficiently formed, so the ductility and stretch flangeability are poor.

Experiment 42 is an example in which the average cooling rate in the first cooling process (primary cooling) is low. Coarse iron-based carbides are formed, and the stretch flangeability is poor Experiment 47 is an example in which the cooling rate in the second cooling process (secondary cooling) is low. Coarse iron-based carbides are formed, and the stretch flangeability is poor.

Experiment 52 is an example where no reheating treatment is performed. The residual austenite phase is unstable, and the stretch flangeability is poor.

Experiments 57, 66, and 82 are examples where only reheating from the Bs point or 480° C. or less to 500° C. or more is performed. The residual austenite phase is unstable, and the stretch flangeability is poor.

Experiments 62 and 70 are examples where only reheating from the Ms point or 350° C. or less to 350° C. or more is performed. The residual austenite phase is unstable, and the stretch flangeability is poor.

Experiment 74 is an example where the time of the treatment at 300 to 450° C. in range is short. Carbon does not concentrate at the residual austenite, the residual austenite phase is unstable, and the stretch flangeability is poor.

Next, Experiment 78 is an example where the holding time at 300 to 450° C. in range is long. Iron-based carbides form, the amount of solid solution C in the residual austenite falls, the residual austenite phase is unstable, and the stretch flangeability is poor.

Next, Experiments 116 to 118 are examples where the composition of ingredients deviated from the predetermined range. In each case, sufficient properties could not be obtained.

From the results of the examples which were explained above, it is clear that according to the high strength steel sheet and high strength galvanized steel sheet which are excellent in shapeability and methods of production of the same of the present invention, high strength steel sheet which secures a tensile maximum strength of 900 MPa or more in high strength while is given excellent ductility and stretch flangeability and has sufficiently high shapeability is obtained.

INDUSTRIAL APPLICABILITY

According to the present invention, for example, in applications such as members which are obtained by shaping steel sheet by press working etc., a tensile maximum strength of 900 MPa or more of high strength is secured while excellent ductility and stretch flangeability are obtained and excellent strength and shapeability are simultaneously obtained. Due to this, for example, in particular, by applying the present invention to the field of auto parts etc., in particular by applying it to the field of automobiles, it is possible to fully enjoy the merits of improved safety along with the increased strength of the chassis, improved shapeability at the time of working the members, etc. The contribution to society is immeasurable.

The invention claimed is:

1. High strength steel sheet which is excellent in shapeability which contains, by mass %, C: 0.075 to 0.300%,
Si: 0.70 to 2.50%,
Mn: 1.30 to 3.50%,
P: 0.001 to 0.030%,
S: 0.0001 to 0.0100%,
Al: 0.005 to 1.500%,
N: 0.0001 to 0.0100%, and
O: 0.0001 to 0.0100%, which contains, as optional elements, one or more of
Ti: 0.005 to 0.150%,
Nb: 0.005 to 0.150%,
B: 0.0001 to 0.0100%,
Cr: 0.01 to 2.00%,
Ni: 0.01 to 2.00%,
Cu: 0.01 to 2.00%,
Mo: 0.01 to 1.00%,
V: 0.005 to 0.150%, and
one or more of Ca, Ce, Mg, Zr, Hf, and REM: total 0.0001 to 0.5000%, and
has a balance of iron and unavoidable impurities, wherein the structure of the steel sheet contains, by volume fraction,
residual austenite phase: 2 to 20%
ferrite phase: 10 to 75%,
bainitic ferrite phase and/or bainite phase: 10 to 50%,
tempered martensite phase: 10 to 50%, and
fresh martensite phase: 10% or less, and
said residual austenite phase has a martensite transformation point of −60° C. or less,
wherein the residual austenite fraction does not change after 5 cycles, one cycle of the S cycles comprising the steps of dipping the steel sheet in liquid nitrogen for 1 hour, taking the steel sheet out of the liquid nitrogen, and allowing the steel sheet to stand in the air until reaching room temperature.

2. The high strength steel sheet which is excellent in shapeability according to claim 1, characterized in that a ratio of said residual austenite phase which transforms to martensite at −198° C. is, by volume fraction, 2% or less of the total residual austenite phase.

3. The high strength steel sheet which is excellent in shapeability according to claim 2, characterized in that said residual austenite phase has a martensite transformation point of −198° C. or less.

4. High strength galvanized steel sheet which is excellent in shapeability characterized by comprising the high strength steel sheet according to claim 2 on the surface of which a galvanized layer is formed.

5. The high strength steel sheet which is excellent in shapeability according to claim 1, characterized in that said residual austenite phase has a martensite transformation point of −198° C. or less.

6. High strength galvanized steel sheet which is excellent in shapeability characterized by comprising the high strength steel sheet according to claim 1 on the surface of which a galvanized layer is formed.

7. A method of production of the high strength steel sheet which is excellent in shapeability according to claim 1, characterized by comprising:
a hot rolling process of heating a slab which contains, by mass %,
C: 0.075 to 0.300%,
Si: 0.70 to 2.50%,
Mn: 1.30 to 3.50%,
P: 0.001 to 0.030%,
S: 0.0001 to 0.0100%,
Al: 0.005 to 1.500%,
N: 0.0001 to 0.0100%, and
O: 0.0001 to 0.0100%,
which contains, as optional elements, one or more of:
Ti: 0.005 to 0.150%,
Nb: 0.005 to 0.150%,
B: 0.0001 to 0.0100%,
Cr: 0.01 to 2.00%,
Ni: 0.01 to 2.00%,
Cu: 0.01 to 2.00%,
Mo: 0.01 to 1.00%,
V: 0.005 to 0.150%, and
one or more of Ca, Ce, Mg, Zr, Hf, and REM: total 0.0001 to 0.5000%, and
has a balance of iron and unavoidable impurities,
directly, or after cooling once, to 1050° C. or more, finishing the rolling at the $Ar_3$ point or more to obtain a steel sheet, and coiling it at 500 to 750° C. in temperature,
a cold rolling process of pickling the coiled steel sheet, then cold rolling it by a screwdown rate of a screwdown rate 35 to 75%, and
an annealing process of heating the steel sheet after the cold rolling process up to a maximum heating temperature of 740 to 1000° C., then cooling by an average cooling rate from said maximum heating temperature to 700° C. of 1.0 to 10.0° C./sec and by a 700 to 500° C. average cooling rate of 5.0 to 200° C./sec, next holding at 350 to 450° C. for 30 to 1000 seconds, then cooling down to room temperature and, while cooling from said maximum heating temperature to room temperature, reheating from the Bs point or less than 500° C. to 500° C. or more at least once and reheating from the Ms point or less than 350° C. to 350° C. or more at least once.

8. A method of production of high strength galvanized steel sheet which is excellent in shapeability characterized by producing high strength steel sheet by the method of production of high strength steel sheet according to claim 7, then galvanizing it.

9. A method of production of high strength galvanized steel sheet which is excellent in shapeability characterized by producing high strength steel sheet by the method of production according to claim 7 during the annealing process of which, at the time of cooling from said maximum heating temperature to room temperature, dipping the steel sheet after said cold rolling process in a zinc bath so as to hot dip galvanize it.

10. A method of production of high strength galvanized steel sheet which is excellent in shapeability according to claim 9 characterized by performing alloying treatment at 470 to 650° C. in temperature after said hot dip galvanization.

11. A method of production of high strength galvanized steel sheet which is excellent in shapeability characterized by producing high strength steel sheet by the method of production according to claim 7 after the annealing process of which performing hot dip galvanization.

12. A method of production of high strength galvanized steel sheet which is excellent in shapeability according to claim 11 characterized by performing alloying treatment at 470 to 650° C. in temperature after said hot dip galvanization.

* * * * *